United States Patent
Ylinen et al.

(10) Patent No.: US 7,694,258 B1
(45) Date of Patent: Apr. 6, 2010

(54) METHOD AND APPARATUS FOR INSERTING METAL FILL IN AN INTEGRATED CIRCUIT ("IC") LAYOUT

(75) Inventors: Judd Matthew Ylinen, San Francisco, CA (US); Kwok Ming Yue, Fremont, CA (US)

(73) Assignee: Cadence Design Systems, Inc., San Jose, CA (US)

( * ) Notice: Subject to any disclaimer, the term of this patent is extended or adjusted under 35 U.S.C. 154(b) by 0 days.

(21) Appl. No.: 11/195,334

(22) Filed: Aug. 1, 2005

(51) Int. Cl.
G06F 17/50 (2006.01)
G06F 9/455 (2006.01)
(52) U.S. Cl. .................................... 716/11; 716/2
(58) Field of Classification Search .............. 716/1, 716/11, 2
See application file for complete search history.

(56) References Cited

U.S. PATENT DOCUMENTS

| | | | |
|---|---|---|---|
| 5,994,766 | A | 11/1999 | Shenoy et al. |
| 6,262,487 | B1 | 7/2001 | Igarashi et al. |
| 6,385,758 | B1 | 5/2002 | Kikuchi et al. |
| 6,483,714 | B1 | 11/2002 | Kabumoto et al. |
| 6,553,555 | B1 | 4/2003 | Green et al. |
| 6,618,846 | B2 | 9/2003 | Cheng |
| 6,645,842 | B2 | 11/2003 | Igarashi et al. |
| 6,734,472 | B2 | 5/2004 | Ho |
| 6,977,440 | B2 | 12/2005 | Pflughaupt et al. |
| 6,988,162 | B2 | 1/2006 | Goergen |
| 7,065,729 | B1 | 6/2006 | Chapman |
| 7,080,339 | B2 | 7/2006 | Jacques et al. |
| 7,117,470 | B1 | 10/2006 | Teig et al. |
| 7,197,738 | B1 | 3/2007 | Hetzel et al. |
| 2002/0114224 | A1 | 8/2002 | Sasaki et al. |
| 2003/0009736 | A1 | 1/2003 | Suto |
| 2004/0049754 | A1* | 3/2004 | Liao et al. ............... 716/8 |
| 2004/0098688 | A1* | 5/2004 | Vuong et al. ............ 716/8 |
| 2004/0145033 | A1 | 7/2004 | McElvain |
| 2005/0044520 | A1* | 2/2005 | Vuong et al. ............ 716/12 |
| 2005/0098895 | A1* | 5/2005 | Hung ...................... 257/758 |
| 2005/0235246 | A1* | 10/2005 | Smith et al. ............. 716/21 |

(Continued)

OTHER PUBLICATIONS

Restriction Requirement of U.S. Appl. No. 10/751,332, mailed Mar. 23, 2006, Hetzel, Asmus, et al.

(Continued)

*Primary Examiner*—Sun J Lin
*Assistant Examiner*—Suresh Memula
(74) *Attorney, Agent, or Firm*—Adeli & Tollen LLP

(57) ABSTRACT

Some embodiments of the invention provide a method for inserting several fills in an integrated circuit ("IC") layout. The method identifies a set of potential fills in a region of an IC layout, where the set of potential fills has a first fill size, wherein the first fill size is from a set of fill sizes. The method specifies a halo around each potential fill in the set of potential fills. For each potential fill, the method determines whether the specified halo overlaps with a foreign object in the region of the layout. For each potential fill, the method specifies a legal fill in the region of the IC layout if the specified halo does not overlap with a foreign object in the region of the IC layout. The method inserts at least one legal fill in the region of the IC layout. In some embodiments, the halo is a spacing halo.

38 Claims, 36 Drawing Sheets

U.S. PATENT DOCUMENTS

2007/0136713 A1    6/2007    Hetzel et al.

OTHER PUBLICATIONS

Non-Final Office Action of U.S. Appl. No. 10/751,332, mailed Jul. 17, 2006, Hetzel, Asmus, et al.
Notice of Allowance of U.S. Appl. No. 10/751,332, mailed Nov. 9, 2006, Hetzel, Asmus et al.
U.S. Appl. No. 11/076,204, filed Mar. 9, 2005, Ylinen, et al.
Restriction Requirement of U.S. Appl. No. 11/076,204, mailed Oct. 30, 2006, Ylinen, et al.
Non-Final Office Action of U.S. Appl. No. 11/076,204, mailed Jan. 30, 2007, Ylinen, et al.
Final Office Action of U.S. Appl. No. 11/076,204, mailed Sep. 17, 2007, Ylinen, et al.
Advisory Action of U.S. Appl. No. 11/076,204, mailed Dec. 11, 2007, Ylinen, et al.
Non-Final Office Action of U.S. Appl. No. 11/076,204, mailed May 15, 2008, Ylinen, et al.
U.S. Appl. No. 12/471,350, filed May 22, 2009, Judd Ylinen, et al., Non-published commonly owned U.S. Appl. No. 11/471,350.
Notice of Allowance of U.S. Appl. No. 11/076,204, mailed Feb. 23, 2009, Judd Ylinen, et al.
Restriction Requirement of U.S. Appl. No. 11/076,204, mailed Nov. 13, 2008, Judd Ylinen, et al.
Non-Final Office Action of U.S. Appl. No. 11/673,429, mailed Jun. 12, 2009, Asmus Hetzel, et al.

* cited by examiner

Group A

Group B

Group C

Group D

US 7,694,258 B1

METHOD AND APPARATUS FOR INSERTING METAL FILL IN AN INTEGRATED CIRCUIT ("IC") LAYOUT

FIELD OF THE INVENTION

Some embodiments of the invention provide a method for inserting metal fill in an integrated circuit layout.

BACKGROUND OF THE INVENTION

An integrated circuit ("IC") is a device (e.g., semiconductor device) that includes many electronic components. An electronic component can be transistor, resistors, diodes, etc. . . . Furthermore, these electronic components can be interconnected together (by using wiring) to form multiple circuit components, such as gates, cells, memory units, etc. . . .

The process of producing these circuit components and/or wiring (e.g., by using an etching process) on an IC often results in circuit components and/or wiring that have different heights for the same layer of the IC. Because an IC typically has several layers that are stacked one on top of each other, it is desirable to have circuit components and/or wiring to have the same height along the entire layer of the IC (i.e., to have a flat surface along the entire layer). This ensures that subsequently placed layers of the IC remain parallel to the other layers of the IC.

To produce a layer of an IC with a flat surface (e.g., global planarization of the layer), a chemical mechanical polishing ("CMP") process is performed after the circuit components and/or wiring are produced on a layer of the IC. As the name implies, a CMP process is a procedure that polishes the layers of the IC to flatten the surface of the layer of the IC. Typically, the CMP process uses an abrasive and/or corrosive slurry that removes excess topological features (e.g., circuit components that extend beyond a certain height above the surface of a particular layer) of the layers of the IC.

However, CMP is a density sensitive process. In particular, the CMP requires that the density of the layer of the IC be within a minimum and maximum range. In other words, for the CMP process to be effective, the density of the IC layer has to be within a particular density range. Ideally, the density of the layer should be uniform throughout the entire layer. The density of the IC layer can be defined as the total area of the circuit components and wiring divided by the total area of the IC layer. When the density of the layer is not uniform or is not within the particular range, some of the side effects of the CMP process may include removing essential topological features (e.g., circuit elements) of the IC layer.

To resolve this issue, engineers insert fills in certain regions of the IC layer to create uniform density throughout the entire IC layer and/or to ensure that local regions of the IC layers meet the minimum density values for the CMP process. These fills are inactive and non-functional materials that are inserted between wiring and circuit components. FIGS. 1 and 2 conceptually illustrate a portion of a Manhattan layout before and after fills are inserted. As shown in FIG. 2, these square fills have one size and are inserted between interconnects.

Current methods of inserting fills are designed for Manhattan IC layouts. Furthermore, current methods of inserting fills do not produce optimal fill configurations. Therefore, there is a need in the art for a method of optimally inserting fills in an IC layout. Ideally, such a method can optimally insert fills in non-Manhattan layouts.

BRIEF SUMMARY OF THE INVENTION

Some embodiments of the invention provide a method for inserting several fills in an integrated circuit ("IC") layout. The method identifies a set of potential fills in a region of an IC layout, where the set of potential fills has a first fill size, where the first fill size is from a set of fill sizes. The method specifies a halo around each potential fill in the set of potential fills. For each potential fill, the method determines whether the specified halo overlaps with a foreign object in the region of the layout. For each potential fill, the method specifies a legal fill in the region of the IC layout if the specified halo does not overlap with a foreign object in the region of the IC layout. The method inserts at least one legal fill in the region of the IC layout. In some embodiments, the halo is a spacing halo.

In some embodiments, before identifying the set of potential fills in a region of the IC layout, the method (1) divides the IC layout into a set of regions, (2) assigns a priority to a region based on one or more areas, and (3) selects a region based on the assigned priority. In some embodiments, the method assigns a priority to a region based on the density of one or more areas. In some embodiments, an area is comprised of a set of regions.

In some embodiments, specifying a legal fill includes dividing the set of potential fills in several groups. The method iteratively selects the group of potential fills. The method specifies at least one legal fill from the groups of potential fills, during one or more iteration of the selection of groups of potential fills. In some embodiments, the fills have more than one size.

Some embodiments provide a method for inserting several fills in an integrated circuit ("IC") layout. The method defines a potential fill in a region of the IC layout. The method defines a halo around the potential fill. The method determines whether the halo overlaps with a foreign object in the region of the IC layout. The method divides the potential fill into at least two legal fills, where the potential fill is divided based on where the halo overlaps with the foreign object. The method inserts at least one legal fill in the region of the IC layout. In some embodiments, the fill is a rectangular fill. In some embodiments, the fill is also divided based on a set of user specified criteria.

BRIEF DESCRIPTION OF THE SEVERAL VIEWS OF THE DRAWINGS

The novel features of the invention are set forth in the appended claims. However, for purpose of explanation, several embodiments of the invention are set forth in the following figures.

DETAILED DESCRIPTION OF THE INVENTION

Figure 1:
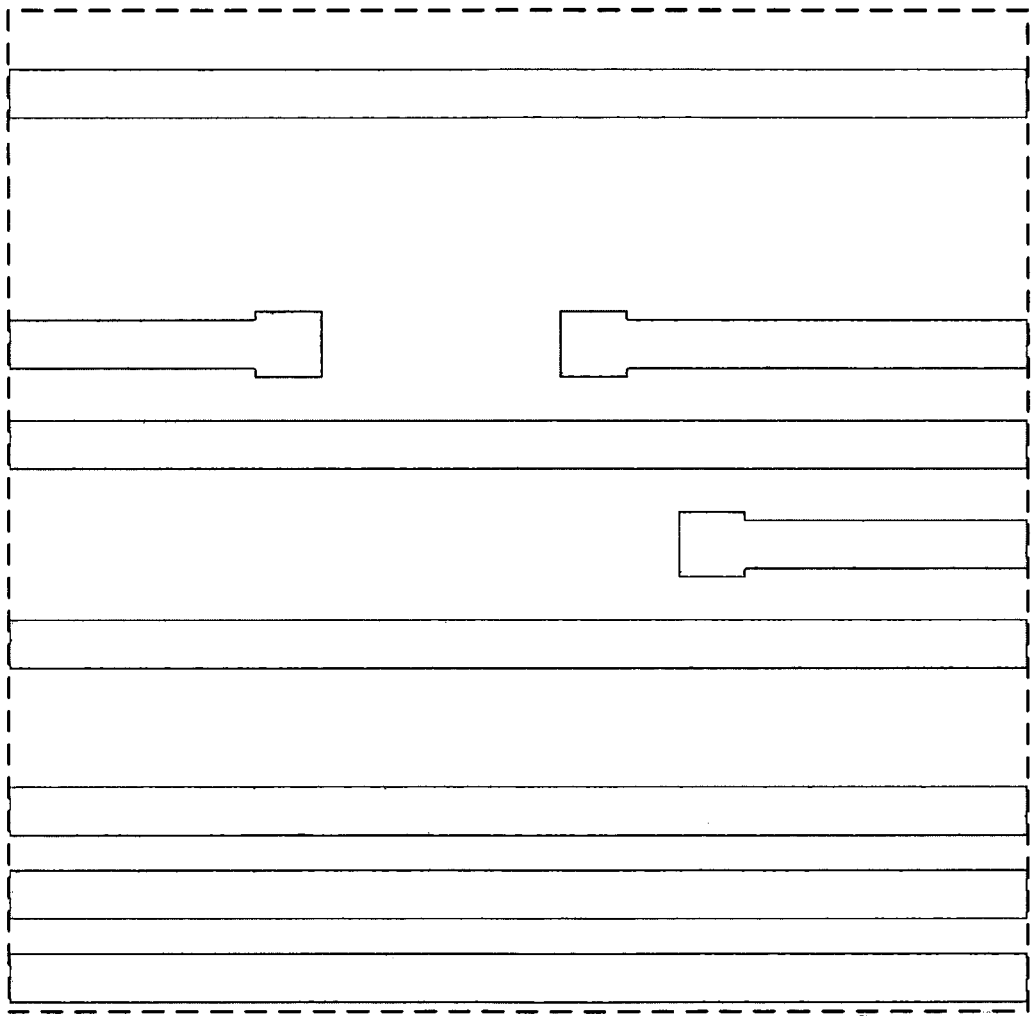
FIG. 1 illustrates a portion of a Manhattan integrated circuit ("IC") layout.
Figure 2:
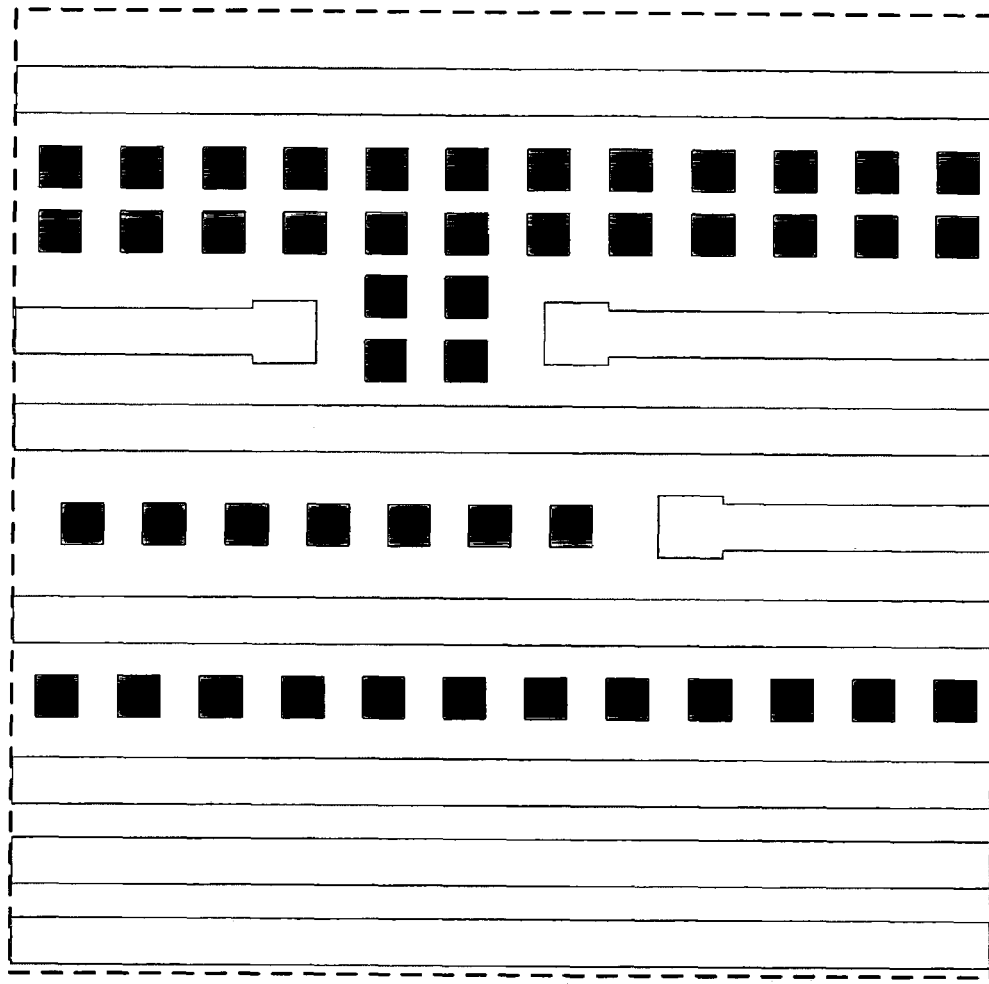
FIG. 2 illustrates a portion of a Manhattan IC layout that includes fills.

In the following description, numerous details are set forth for purpose of explanation. However, one of ordinary skill in the art will realize that the invention may be practiced without the use of these specific details. In other instances, well-known structures and devices are shown in block diagram form in order not to obscure the description of the invention with unnecessary detail.

Some embodiments of the invention provide a method for inserting several fills in an integrated circuit ("IC") layout. The method identifies a set of potential fills in a region of an IC layout, where the set of potential fills has a first fill size, where the first fill size is from a set of fill sizes. The method specifies a halo around each potential fill in the set of potential fills. For each potential fill, the method determines whether the specified halo overlaps with a foreign object in the region of the layout. For each potential fill, the method specifies a legal fill in the region of the IC layout if the specified halo does not overlap with a foreign object in the region of the IC layout. The method inserts at least one legal fill in the region of the IC layout. In some embodiments, the halo is a spacing halo.

In some embodiments, before identifying the set of potential fills in a region of the IC layout, the method (1) divides the IC layout into a set of regions, (2) assigns a priority to a region based on one or more areas, and (3) selects a region based on the assigned priority. In some embodiments, the method assigns a priority to a region based on the density of one or more areas. In some embodiments, an area is comprised of a set of regions.

In some embodiments, specifying a legal fill includes dividing the set of potential fills in several groups. The method iteratively selects the group of potential fills. The method specifies at least one legal fill from the groups of potential fills, during one or more iteration of the selection of groups of potential fills. In some embodiments, the fills have more than one size.

Some embodiments provide a method for inserting several fills in an integrated circuit ("IC") layout. The method defines a potential fill in a region of the IC layout. The method defines a halo around the potential fill. The method determines whether the halo overlaps with a foreign object in the region of the IC layout. The method divides the potential fill into at least two legal fills, where the potential fill is divided based on where the halo overlaps with the foreign object. The method inserts at least one legal fill in the region of the IC layout. In some embodiments, the fill is a rectangular fill. In some embodiments, the fill is also divided based on a set of user specified criteria.

In some embodiments, a tile is a region of the IC layout, while a window is an area of the IC layout. Different embodiments of the invention determine legal fills differently. A method for determining legal fills is described in Section II. However, before describing such a method, a method for designing an IC which includes inserting fills in an IC layout is first described in Section I.

I. Method for Inserting Fill

A. Overview of Designing an IC

Figure 3:
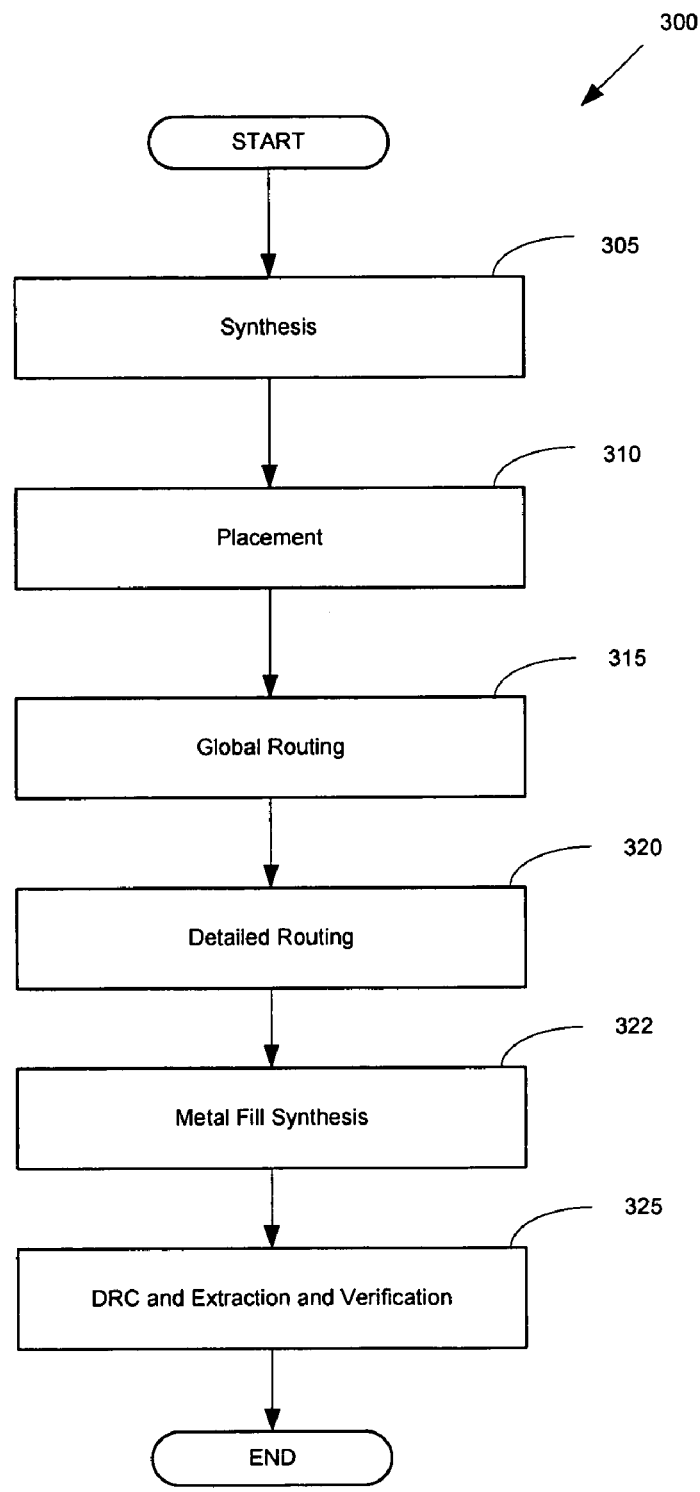
FIG. 3 illustrates a process for designing an IC, where the process includes a process for inserting fill in an IC layout.

The method of inserting fills in an IC layout is performed during the designing of an IC. FIG. 3 illustrates a process 300 for designing an IC. As shown in this figure, the initial operation of the process 300 is a synthesis operation 305. This operation develops a circuit representation of the IC based on a logical representation of the IC. The logical representation provides a behavioral description of the IC (i.e. description of the functions(s) of the IC), while the circuit representation provides a circuit description of the IC. The circuit description is typically provided in terms of circuit elements, such as cells, macros, gates, transistors and interconnection between these elements.

As further shown in FIG. 3, the operation after the synthesis operation in the process 300 is a placement operation 310. This placement operation converts the circuit representation of the IC into a geometric representation. The geometric representation is called a layout. The layout is created by converting the circuit elements specified during the synthesis operation into geometries. A placer performs a placement operation. Specifically, the placer identifies the position of geometries (e.g., circuit modules geometries) on the layout. In some embodiments, the goal of the placer is to position the geometries on the layout in view of certain objective functions or design criteria, such as occupying a minimum area. In some embodiments, the placer performs this operation based on information contained in a design file (e.g., LEF/DEF file), which contains information regarding the physical design of the IC.

As further shown in FIG. 3, the operation after the placement operation 310 in the process 300 is a global routing operation 315. The global routing operation 315 is performed after the placer has positioned the geometries on the layout. A router performs the global routing operation 315. During the global routing operation 315, the router specifies different regions in the routing space through which a wire should be routed. In some embodiments, the router completes the connection between blocks of the circuit, while disregarding the exact geometric details of each wire or pin.

As shown in FIG. 3, the detailed routing operation 320 follows the global routing operation 315. A router also performs the detailed routing operation 320. In some embodiments, the router defines routes that connect the routable elements (e.g., pins) of nets in the layout. The router defines such a route in view of certain objective functions or design criteria, such as minimizing wirelength, minimizing congestion, etc. As previously mentioned, in some embodiments, the router performs this detailed routing operation 320 based on information contained in the design file (e.g., LEF/DEF file).

As further shown in FIG. 3, the metal fill synthesis operation 322 follows the detailed routing operation 320. In some embodiments, the metal fill synthesis operation 322 inserts fills in the IC layout. A method for inserting fill is further described below in Section I.B.

As shown in FIG. 3, the design rule checking and extraction-verification operations 325 follow the metal fill synthesis operation 322 in the process 300. In some embodiments, the design rule checking operation is performed by a design rule checker ("DRC"). The DRC verifies that all geometries on the layout meet certain design rules (e.g., dimensional attributes of routes). For instance, the DRC may check that the separation between wires is consistent with the specified designs. The DRC may also check that the width and/or spacing of the routes meet the design rules. In some embodiments, these design rules are located in a design file (e.g., rule deck file). Once the DRC has verified that all the design rules are met, some embodiments extract resistance and capacitance information from the layout, and use the extracted information to verify that the design of the IC meets certain operational requirements. The extracted information can be verified by comparing them to a design file (e.g., LVS file, RCX file). In some embodiments, these requirements include performance objectives and physical constraints. For example, the information that is extracted is used to verify the functionality of the layout (i.e., to verify that the circuit performs as designed).

Some embodiments might perform several iterations of the synthesis, placement, global routing, detailed routing, metal fill, DRC and extraction-verification operations in order to design the IC. These iterations might be performed within each operation and/or between different operations. During these iterations, various configurations and designs are specified by the synthesis, placement, global routing, detailed routing, metal fill, DRC and extraction-verification operations in order to achieve an optimal IC design.

B. Flow for Metal Fill Synthesis

Figure 4:
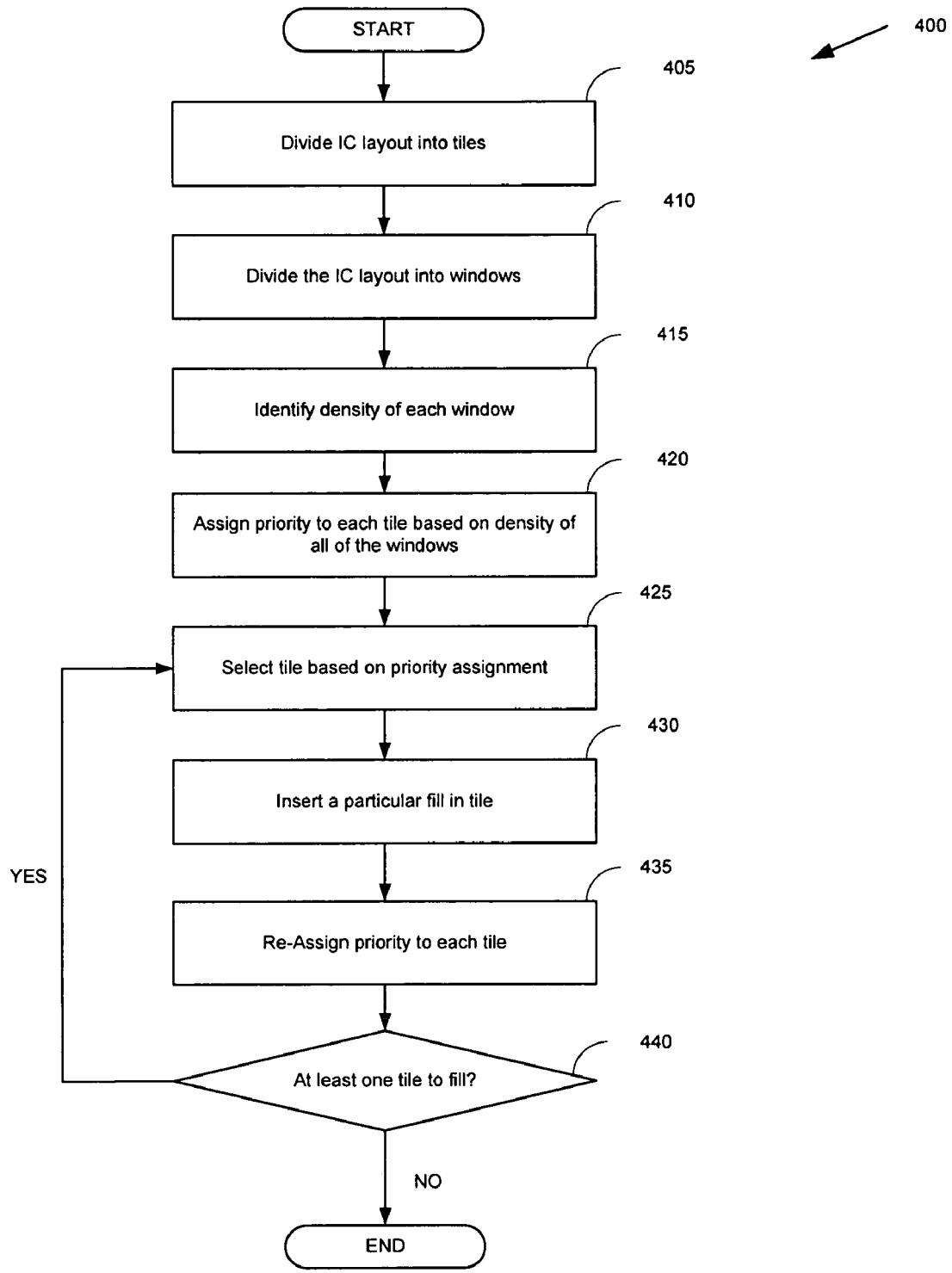
FIG. 4 illustrates a process for inserting metal fill in an IC layout.

FIG. 4 illustrates a metal fill synthesis operation of an IC design process. Specifically, this figure illustrates a method 400 for inserting fills in a layer of an IC layout. In some embodiments, the method 400 is performed during the metal fill synthesis operation 322 of process 300. In some embodiments, the method 400 of inserting fills starts after receiving an IC layout that includes circuit elements and routes that connect the circuit elements.

Figure 5:
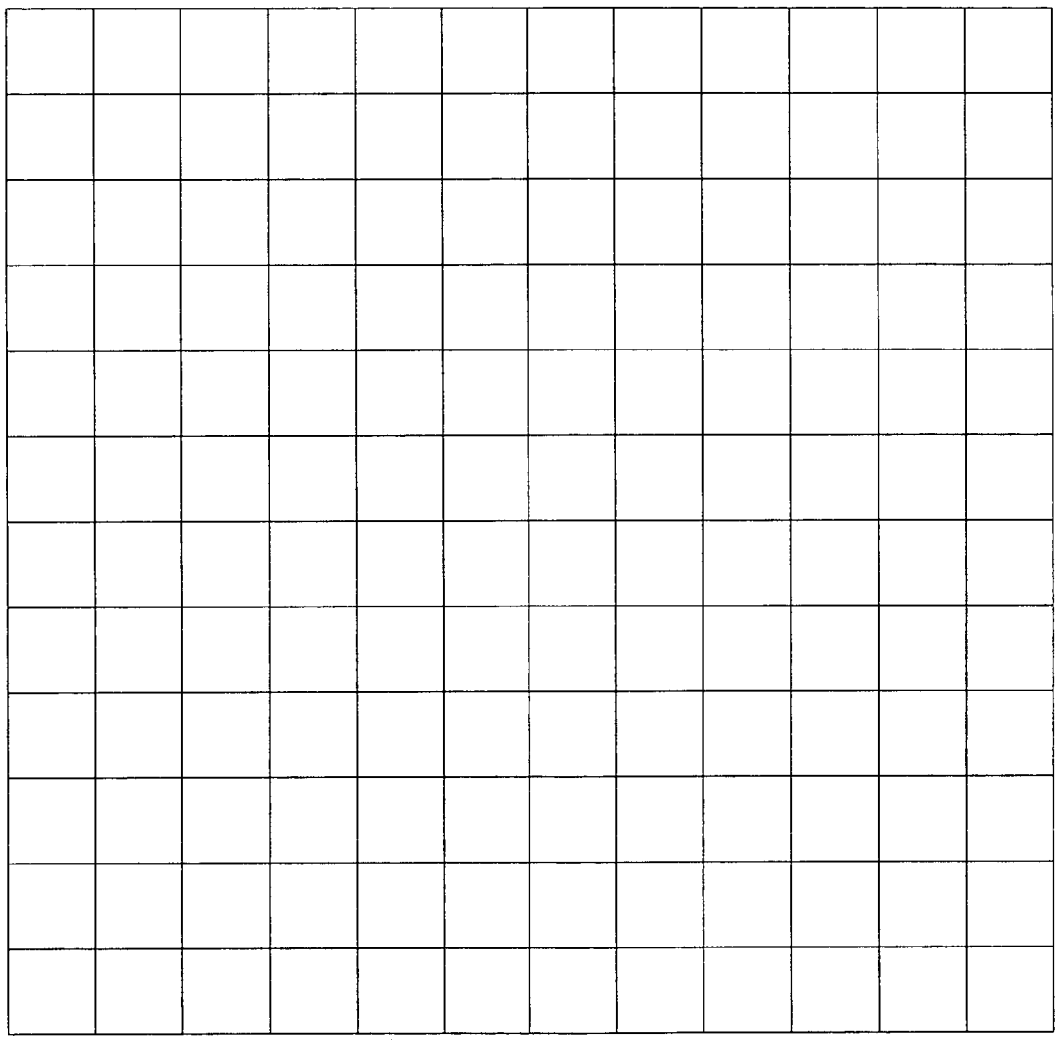
FIG. 5 illustrates a layer of an IC layout divided into tiles.

As shown in FIG. 4, the method 400 first divides (at 405) the IC layout into tiles. FIG. 5 conceptually illustrates a layer of an IC layout divided into several tiles. As shown in this figure, the layer of the IC layout is divided into an array of 12 by 12 square tiles. However, different embodiments, may divide the layer of the IC layout differently (i.e., use different array dimensions). In some embodiments, the dimensions of the array of tiles are specified by a user. Furthermore, other embodiments may use tiles that have other types of shapes (e.g., rectangle).

Figure 6:
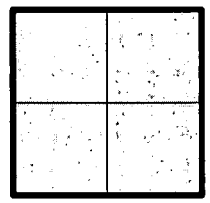
FIG. 6 illustrates windows that can be formed by several tiles.
Figure 6:
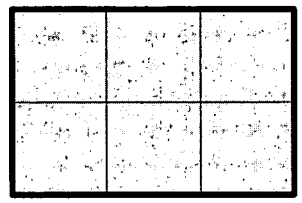
Figure 6:
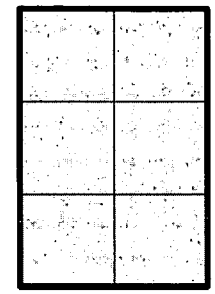
Figure 6:
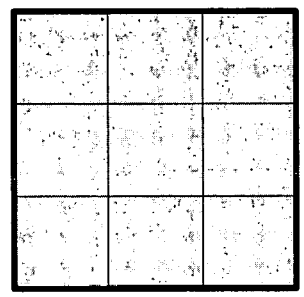
Figure 6:
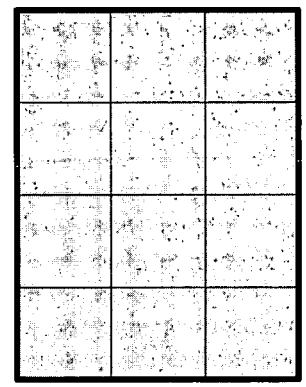
Figure 6:
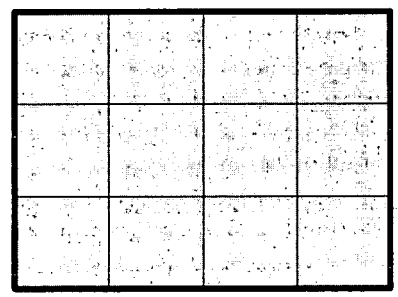
Figure 7:
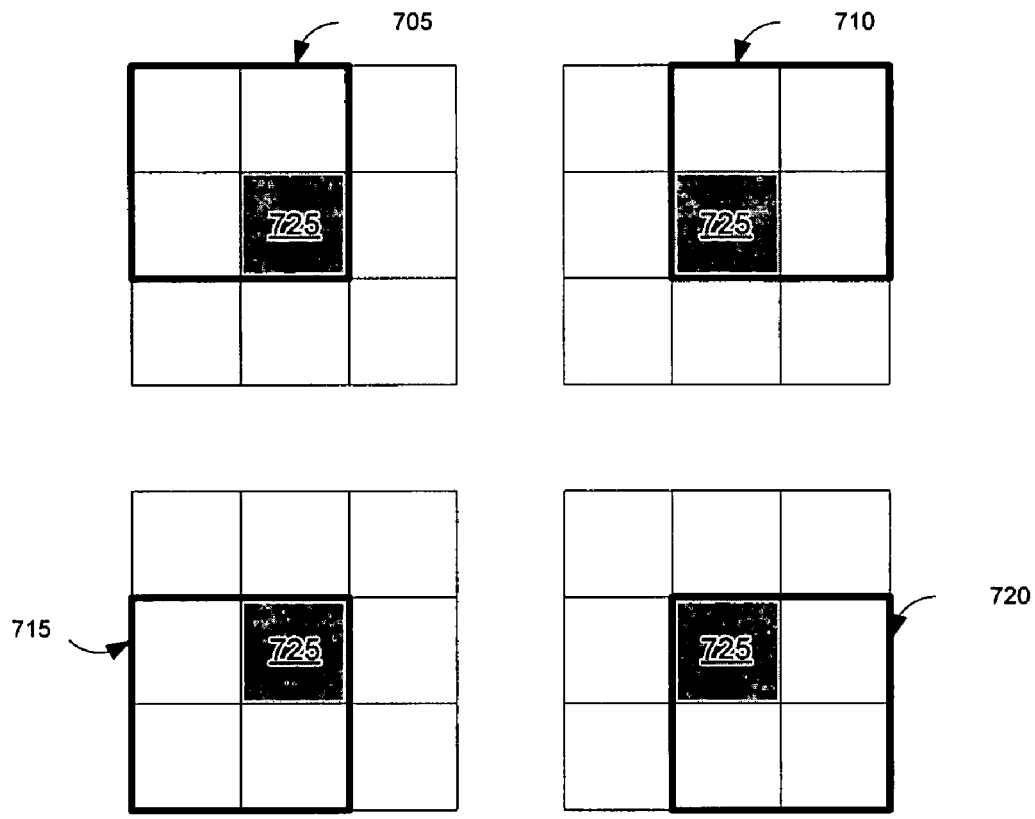
FIG. 7 illustrates the number of different windows that can include the same tile.

Once the layer of the IC layout is divided (at 405) into tiles, the method 400 divides (at 410) the layer of the IC layout into several windows. In some embodiments, a window is a collection of tiles. In some embodiments, a window includes a set of 2 by 2 tiles. However, different embodiments may use different window sizes, such as those shown in FIG. 6. In the instances where a window includes a set of 2 by 2 tiles, a particular tile in the layer of the IC layout may be associated with four separate windows, as shown in FIG. 7. Specifically, this figure illustrates a tile 725 associated with four different windows 705-720. As shown in this figure, the tile 725 is located in different locations for each window. For instance, the tile 725 is located in the lower right corner of the window 705; the lower left corner of the window 710; the upper right corner of the window 715; and the upper left corner of the window 720. Different embodiments may use different window dimensions (i.e., use a window with a different array of tiles). Furthermore, in some embodiments, the size of the window may be specified by a user.

After dividing (at 410) the layer of the IC layout into windows, the method 400 identifies (at 415) the density of each window. In some embodiments, the density of a window is defined as the area occupied by the circuit elements, routes and fills divided by the total area of the window.

Figure 8:
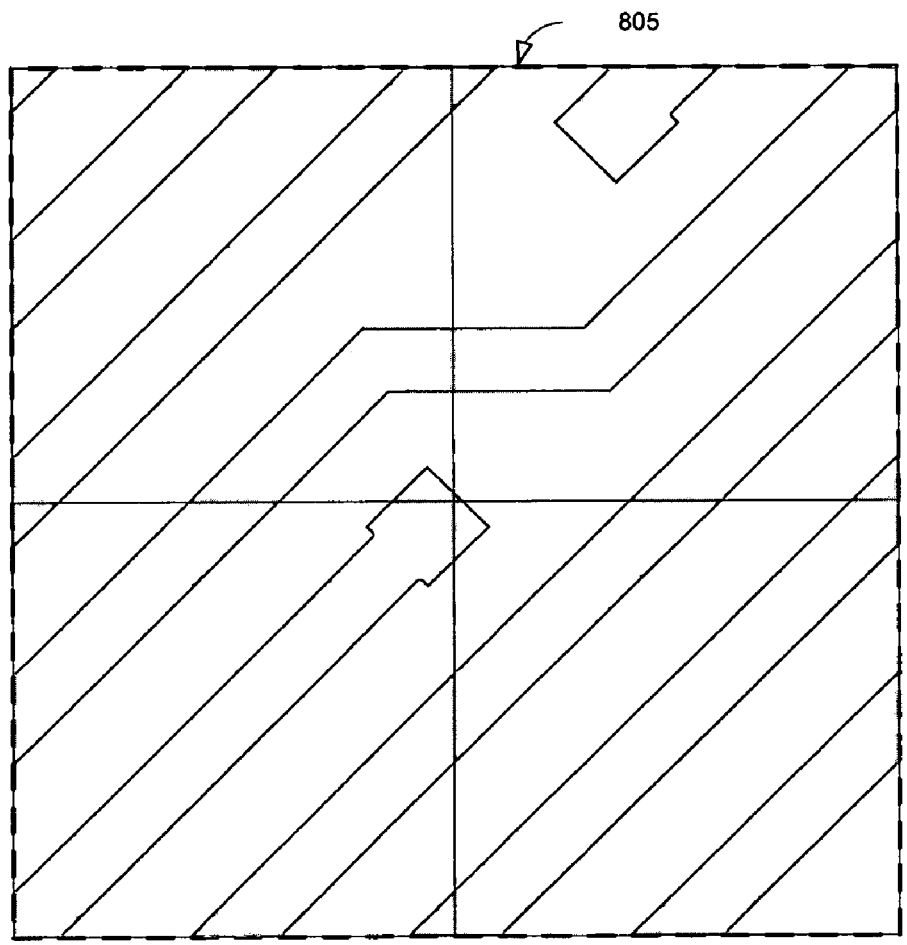
FIG. 8 illustrates a window that has a density that is within parameters.
Figure 9:
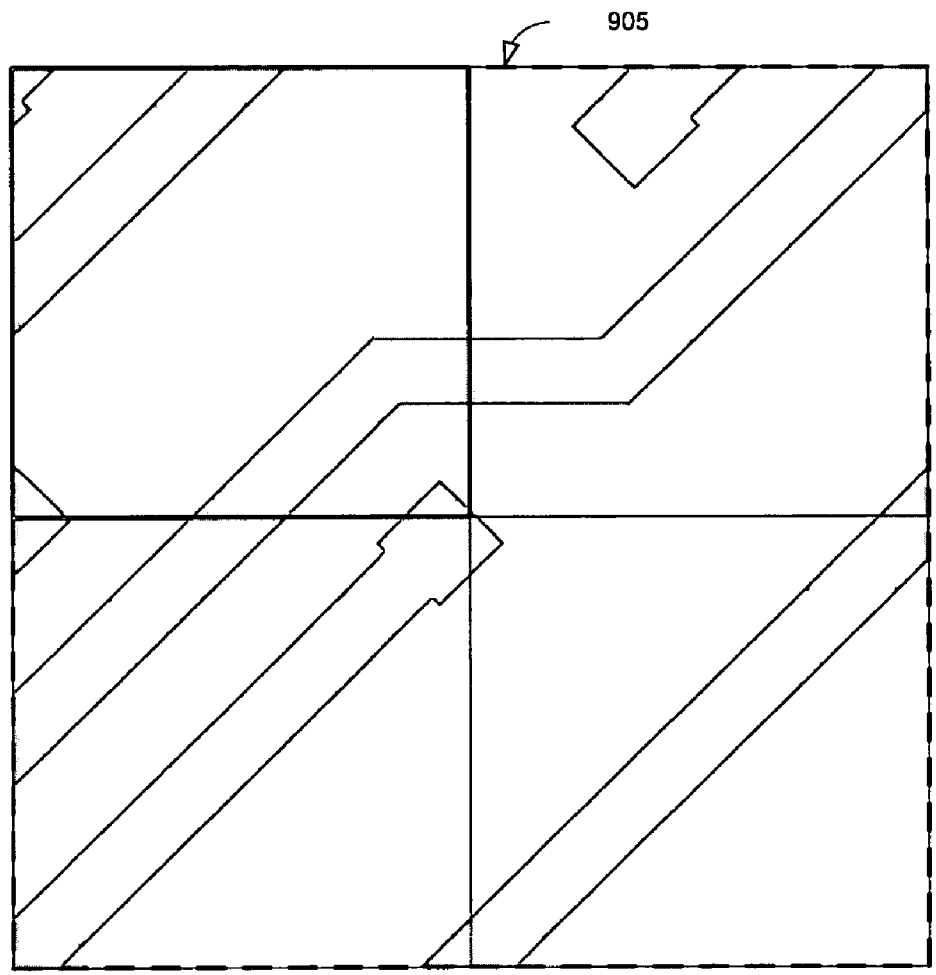
FIG. 9 illustrates a window that has a density outside the parameters.

FIGS. 8 and 9 illustrate examples of windows with different densities. Specifically, FIG. 8 illustrates a window 805 which has a density that is higher than the density of window 905 (which is shown in FIG. 9). In some embodiments, the density of window 805 meets the minimum density requirement. In some embodiments, the density of window 910 does not meet the minimum density requirement. However, different embodiments may use different minimum density requirements. In which case, window 805 may meet the minimum density requirement while window 905 may not meet the minimum density requirement, in some embodiments.

Figure 10:
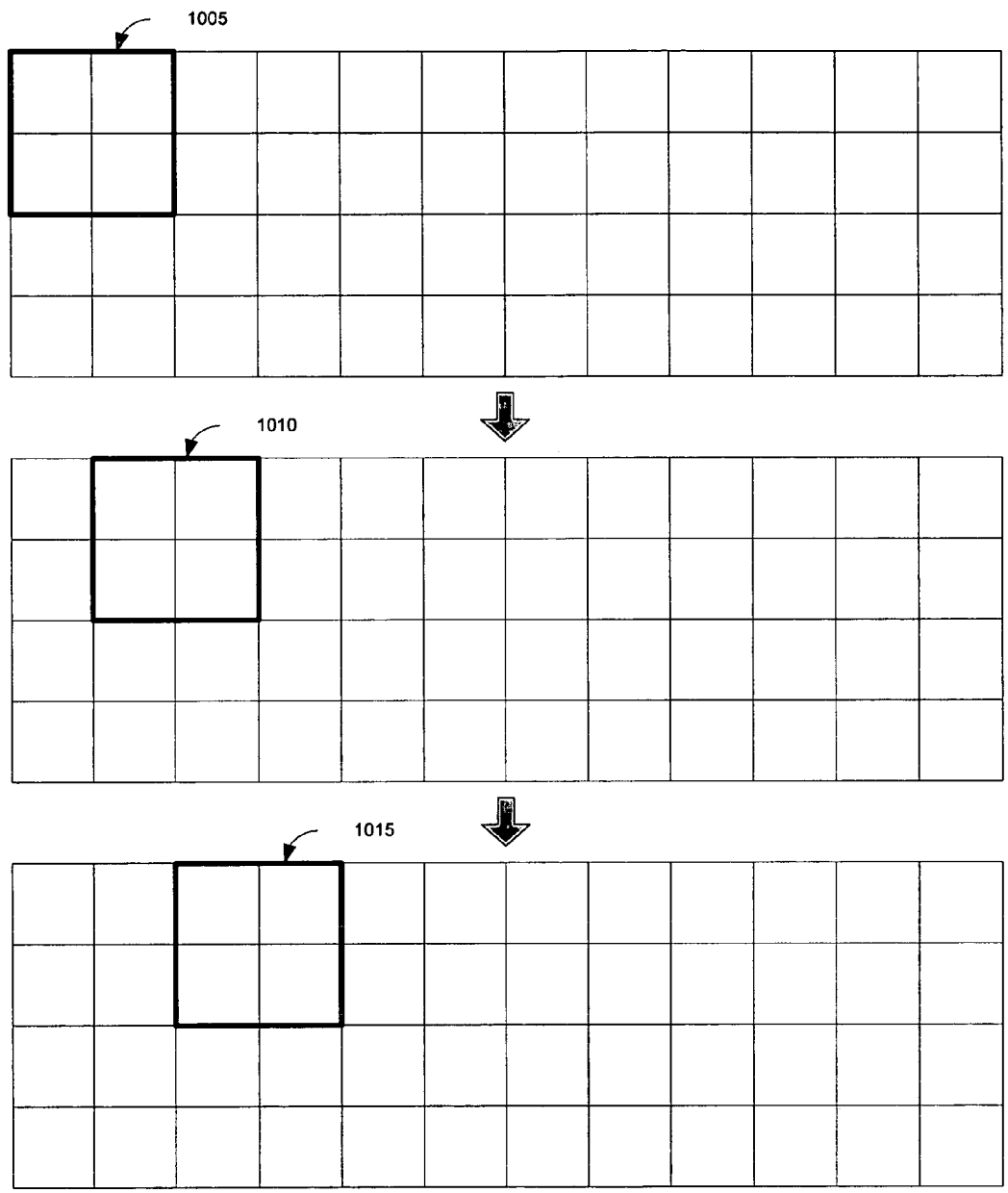
FIG. 10 illustrates a method of computing the density of windows in an IC layout.

FIG. 10 illustrates a sequence of identifying the density of several windows in the layer of the IC layout. As shown in this figure, the method 400 first computes the density of window 1005. After computing the density of window 1005, the method 400 computes the density of window 1010 and 1015, respectively. However, different embodiments may compute the density of the windows in different sequences.

Once the density of all the windows have been computed (at 415), the method 400 assigns (at 420) a priority to each tile. In some embodiments, assigning priorities to tiles determines the order that a tile will be processed when fills are inserted in the layer of the IC layout. In some embodiments, the priority for each particular tile is assigned based on the density of the windows that include the particular tile.

In some embodiments, the priority for each particular tile is based on the density of the window that has the highest density from a set of windows that includes the particular tile. Specifically, some embodiments assign priorities for tiles by selecting for each particular tile, the window with the highest density from a set of windows that includes the particular tile. Once the window is selected for each particular tile in the IC layout, the tile that includes the selected window with the lowest density is then assigned the highest priority. Next, the tile that includes the selected window with the second lowest density is assigned the second highest priority. In some embodiments, this process of assigning priorities is iteratively performed for all the tiles in the IC layout, where subsequent tiles with higher densities are assigned sequentially lower priorities.

In some embodiments, all the windows that include a particular tile may meet the minimum density requirement. In such cases, that particular tile is assigned a priority which indicates that no fills should be inserted in that particular tile (i.e., the tile will not be processed further during the fill insertion process). Some embodiments might define a zero priority for all tiles that are contained in windows that meet the minimum density requirement or for all tiles that are contained in any window that meet the maximum density requirement. In some embodiments, a tile with a zero priority will not be further processed during the fill insertion process.

Once the priorities of the tiles have been assigned (at 420), the method 400 selects (at 425) the tile with the highest priority (i.e., tile associated to a window with the lowest density). After selecting (at 425) the tile, the method 400 inserts (at 430) a fill in the particular tile. In the present application, the phrase inserting a fill in the tile is defined to mean inserting a fill in an area of the layer of an IC layout that is encompassed by the tile.

Different embodiments insert fills differently. In some embodiments, the method 400 inserts a fill from a set of legal fills for the particular tile. A method for inserting fill from a set of legal fills is further described below in Section II.

Figure 11:
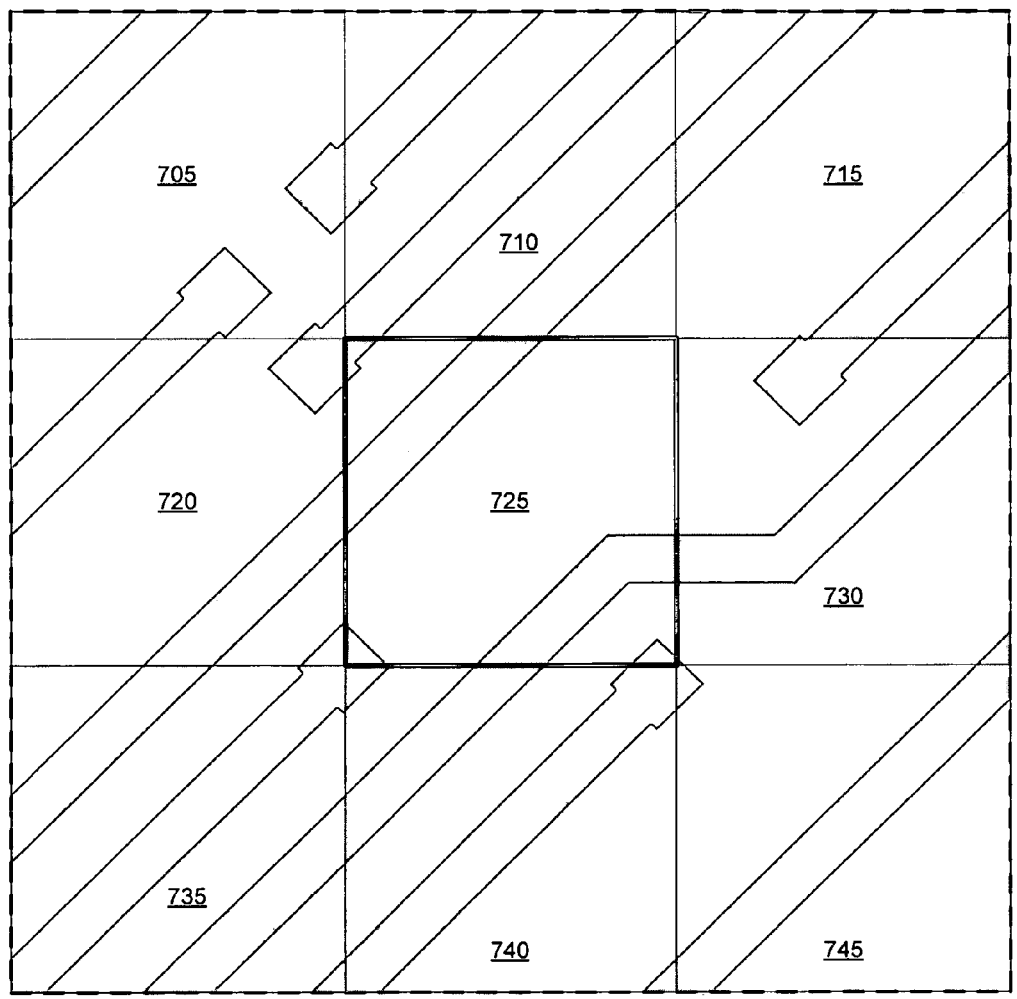
FIG. 11 illustrates a selected tile in an IC layout surrounded by neighboring tiles.

After inserting (at 430) the fill in the particular tile, the method 400 re-assigns (at 435) the priorities of the tiles. In some embodiments, the method 400 re-assigns (at 435) the priorities of tiles that are included in windows associated with the selected tile. In other words, if the selected tile has four associated windows, then the priority of the selected tile and tiles included in the associated windows are re-assigned. FIG. 11 conceptually illustrates a selected tile and tiles that are part of the windows that include the selected tile. In some embodiments, when the method 400 inserts (at 430) a fill in the selected tile 1125, the priorities of tiles 1105-1145 are re-assigned (at 435).

In some embodiments, re-assigning (at 435) the priorities of tiles is based on the density of the windows after the fill has been inserted in the selected tile. Therefore, in some embodiments, after inserting (at 435) the fill in the tile, the method 400 computes the new density of the windows that include the tile with the fill during the re-assignment of the tiles (at 435).

After re-assigning (at 435) the priorities of the tiles, the method 400 determines (at 440) whether there are more tiles to fill. If so, the method 400 proceeds to 425 to select a tile. In some embodiments, the method 400 selects (at 425) the particular tile with the highest priority and inserts one or more fills in the particular tile. In some embodiments, the process of selecting a tile, inserting a fill and re-assigning priorities is iteratively performed until the priorities of the tiles indicate that all the windows meet the minimum density requirement (e.g., when the priority of all the tiles is zero) or if no legal fills can be legally inserted. If the method 400 determines (at 440) that there are no more tiles to fill, the method 400 ends.

While the method 400 is described for inserting fill on a particular layer of an IC layout. The method 400 can be iteratively performed for all the layers of the IC layout, in some embodiments. Furthermore, during the insertion step (at 430), the method 400 may insert one or more fills, in some embodiments of the invention. As described above a metal fill synthesis operation (e.g., inserting fills in an IC layout) is performed before the extraction-verification operation. However, in some embodiments, the metal fill synthesis operation may be performed during different stages of the IC design process. While one method is described to assign priorities to the tiles, some embodiments may assign priorities to tiles differently.

Furthermore, in some embodiments, the inserted fills are floating fills (i.e., unconnected fills). However, in some embodiments, the inserted fills may be passed on to the router, such that routes (i.e., wiring) are connected to the inserted fills. These routes allow the inserted fills to be connected to ground or power (i.e., VSS/VDD). In some instances, particular inserted fills cannot be connected to ground or power. In such cases, these particular inserted fills are flagged and they can be either left as floating fills or removed entirely from the layout.

II. Inserting Fill in Tile from a Set of Legal Fills

Figure 12:
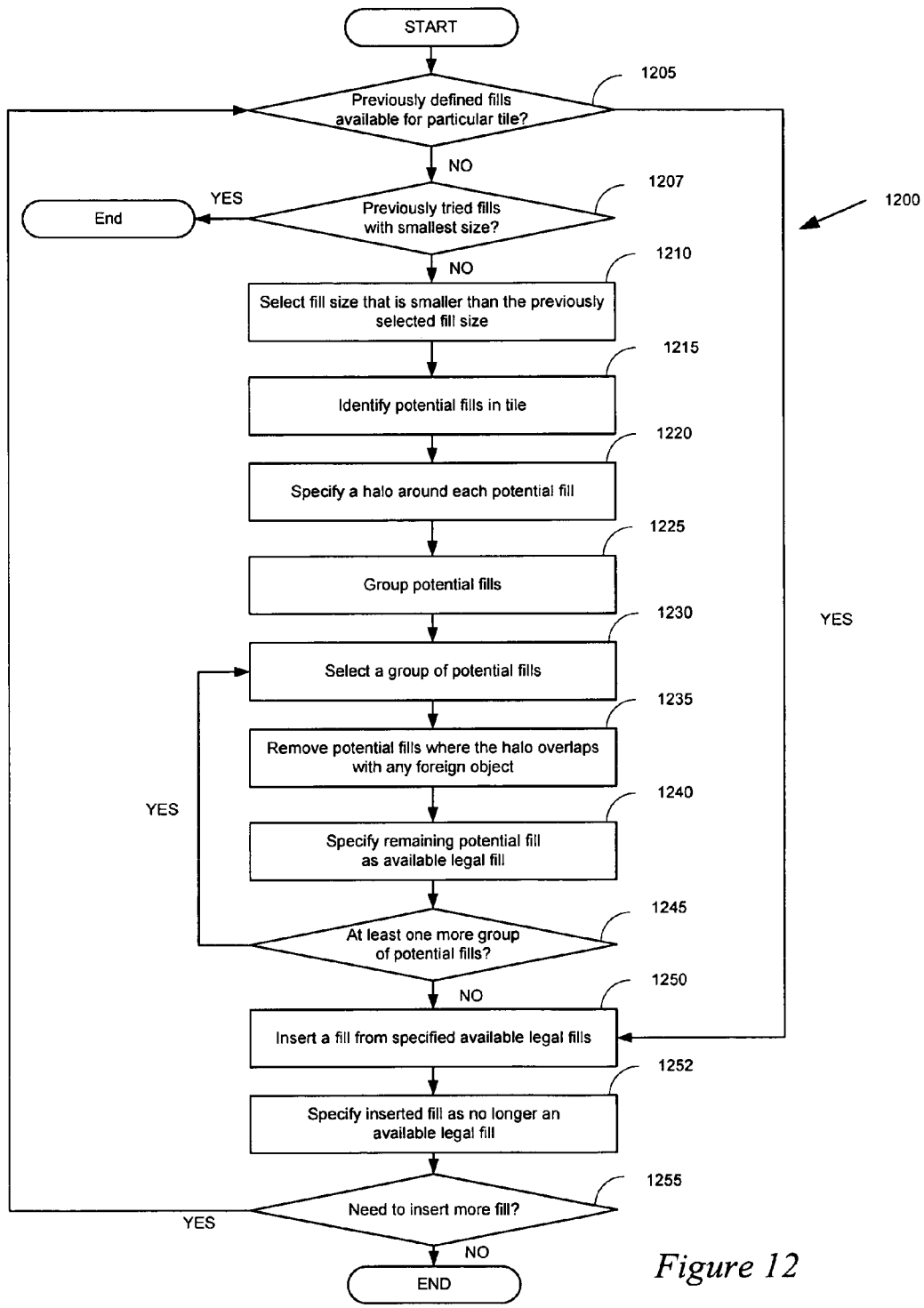
FIG. 12 illustrates a method for determining how to insert a fill in a given tile.

As mentioned above, some embodiments insert fill in a tile from a set of legal fills. FIG. 12 conceptually illustrates a method 1200 for inserting a fill in a tile from a set of legal fills. In some embodiments, the method 1200 is performed during step 430 of the method 400 described above.

A. Flow for Determining and Inserting Legal Fills

As shown in FIG. 12, the method 1200 first determines (at 1205) whether previously defined legal fills are available for the particular tile. In some embodiments, if this is the first iteration of inserting fill for the particular tile, no legal fills will be available. However, if this particular tile has previously been processed by the method 1200 (e.g., legal fills have been specified by the method during a previous iteration), there may be one or more available legal fills, in some embodiments.

If the method 1200 determines (at 1205) there is at least one previously defined legal fill, the method 1200 proceeds to insert (at 1250) a fill from the previously defined available legal fill. This step of inserting (at 1250) a legal fill is further described below.

However, if the method 1200 determines (at 1205) there are no previously defined legal fills, the method 1200 determines (at 1207) whether the fills with the smallest size was previously tried. If so, the method 1200 ends. However, if the method 1200 determines (at 1207) that the fills with the smallest size was not previously tried, the method 1200 selects (at 1210) a fill size from a set of fill sizes. The set of fill sizes includes maximum and minimum fill sizes. In some embodiments, the method 1200 selects (at 1210) a fill size that is smaller than the previously selected fill size. The selection and use of different size fills is further described below in Section II.B.

Figure 13:
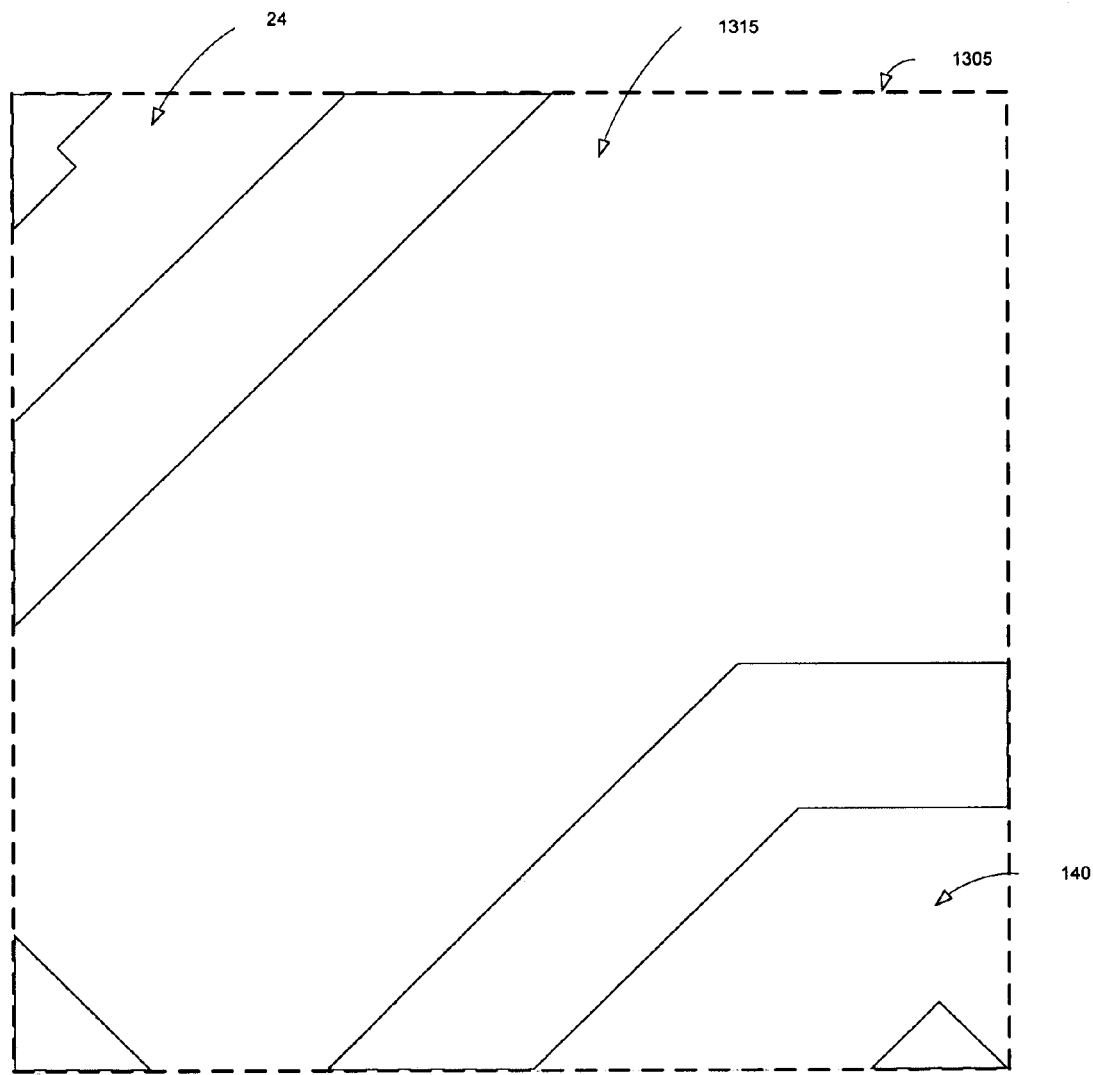
FIG. 13 illustrates a tile that is being processed to insert fill.
Figure 14:
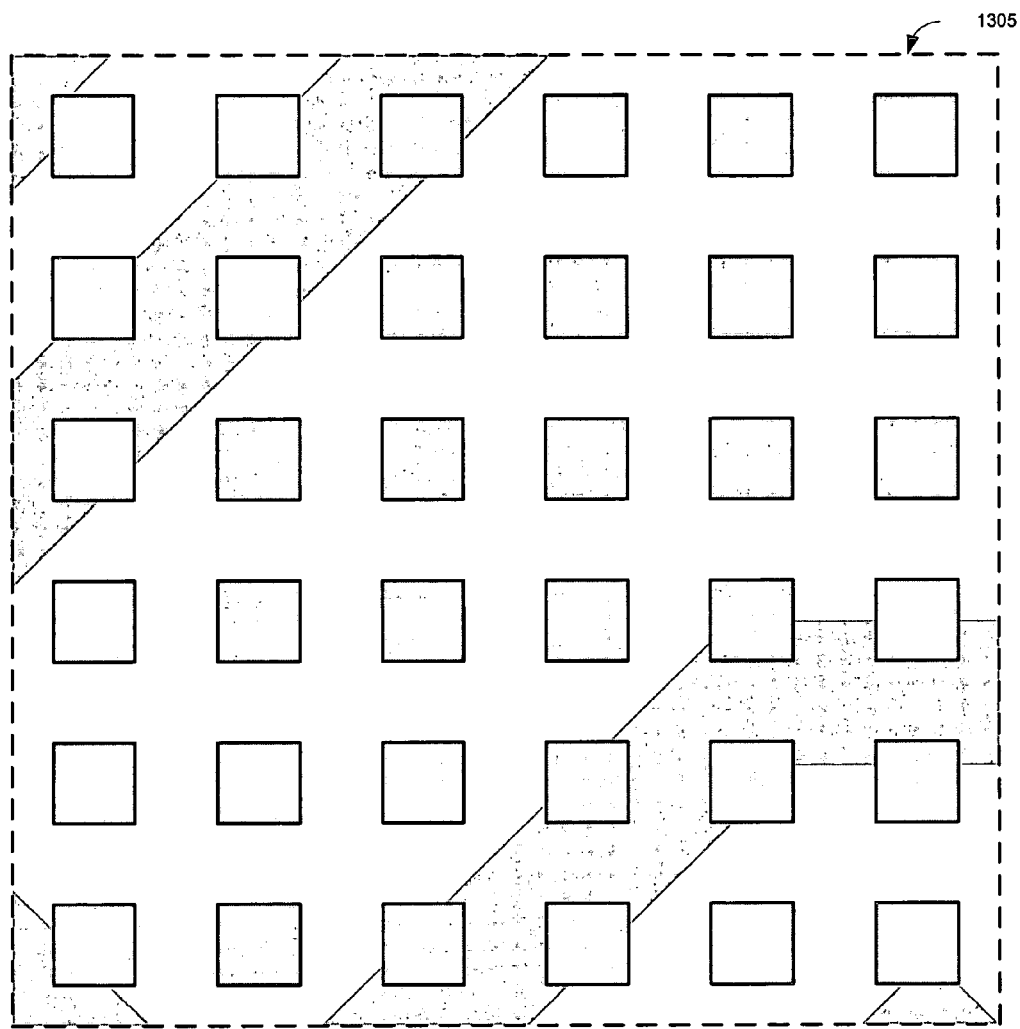
FIG. 14 illustrates a tile with potential square fills.

After selecting (at 1210) the fill size, the method 1200 identifies (at 1215) several potential fills in the tile. Different embodiments identify the potential fills differently. FIG. 13 illustrates a tile 1305 before potential fills have been identified. Specifically, this figure illustrates the tile 1305 with three empty spaces 24-140 where fills can be inserted. FIG. 14 illustrates the tile 1305 with identified potential fills. As shown in this figure, the potential fills are represented by the squares in the tile 1305. In some embodiments, each square represents the location of a potential fill.

Figure 15:
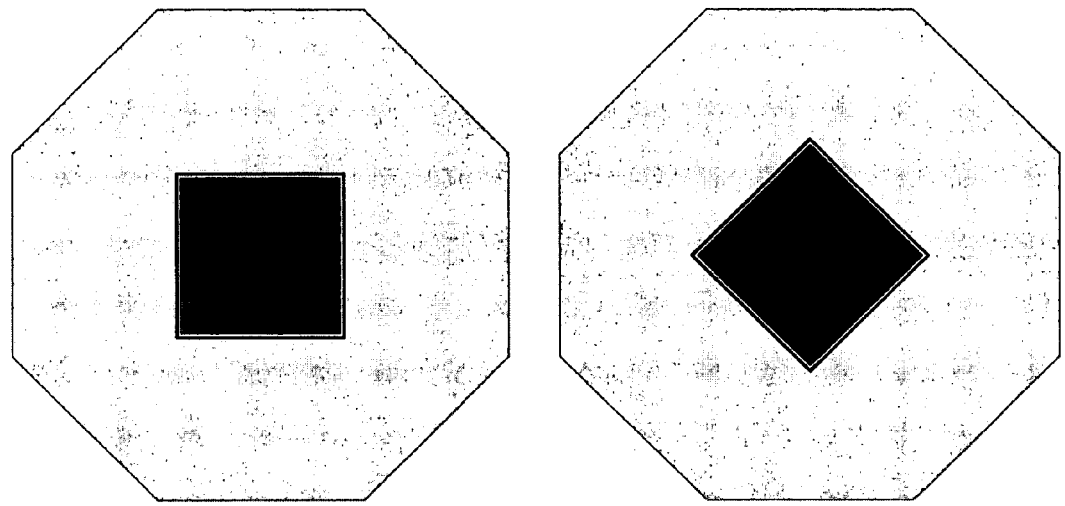
FIG. 15 illustrates creating halos around different shape fills.

Once the potential fills have been identified (at 1215), the method 1200 specifies (at 1220) a halo around each potential fill in the tile. In some embodiments, a halo is a spacing halo that defines an area around a fill that cannot be occupied by a route, circuit element, and/or another fill. These halos prevent spacing violations in the IC layout. FIG. 15 conceptually illustrates halos created around fills. Specifically, this figure illustrates halos created around square and diamond fills.

Figure 16:
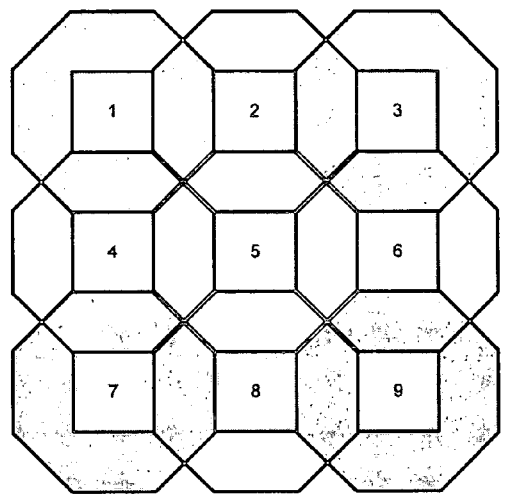
FIG. 16 illustrates a set of fills divided into groups of fills.
Figure 16:
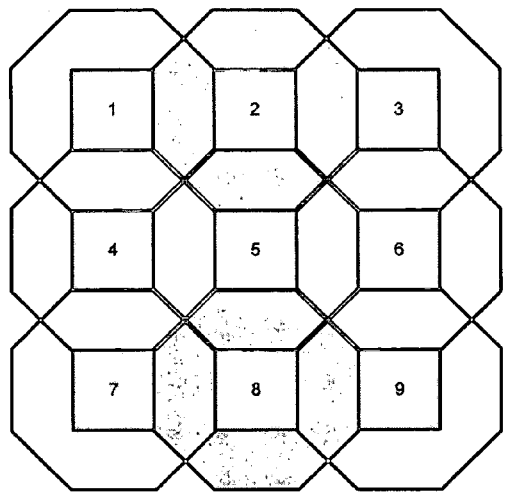
Figure 16:
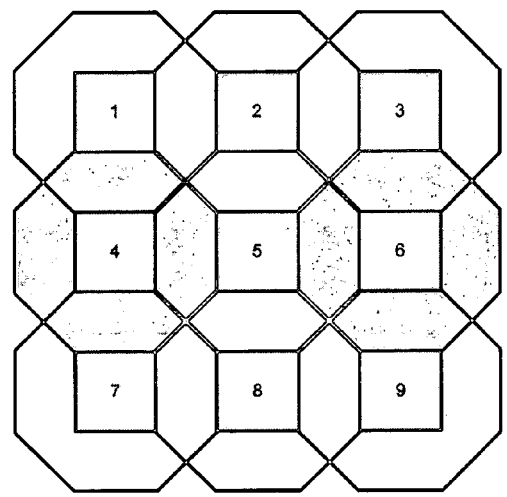
Figure 16:
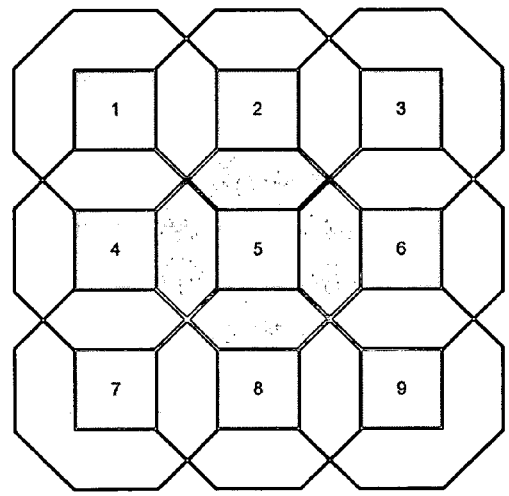
Figure 17:
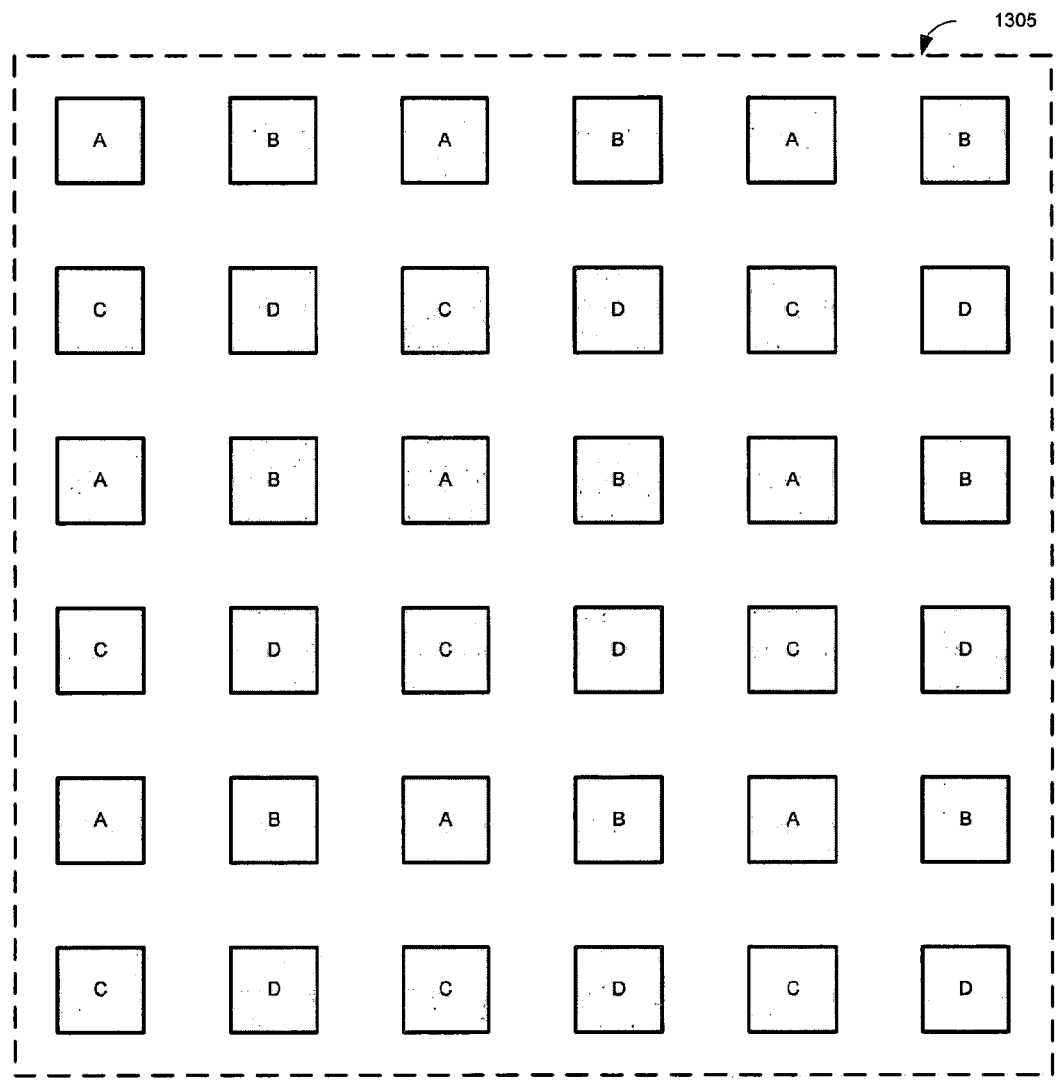
FIG. 17 illustrates the identification of groups of potential fills in a tile.

After specifying (at 1220) a halo around each potential fill, the method 1200 groups (at 1225) the potential fills. As shown in FIG. 16, some embodiments, group the potential fills in four (4) sets of potential fills. Specifically, this figure illustrates that the potential fills are grouped such that the halo of each fill does not overlap with the halo of another fill in the group. Thus, for a set of 3×3 potential fills, the first group (e.g., group A) includes the first, third, seventh and ninth potential fills. The second group (e.g., group B) includes the second and eight potential fills. The third group (e.g., group C) includes the fourth and sixth potential fills. The fourth group (e.g., group D) includes the fifth potential fill. FIG. 17 illustrates groups of potential fills for the tile 1305. Specifically, this figure illustrates a 6 by 6 array of potentials fills divided into groups A, B, C and D. Each of these groups includes nine potentials fills at different locations in the tile 1305.

Once the fills have been grouped (at 1225), the method 1200 selects (at 1230) a group of potential fills. From this group of fills, the method 1200 removes (at 1235) any potential fill whose associated halo overlaps with a foreign object (e.g., interconnect, circuit module, fill) in the tile.

After removing (at 1235) the illegal potential fills, the remaining potential fill is specified (at 1240) as an available legal fill by the method 1200. The method 1200 determines (at 1245) whether there is at least another group of fills. If so, the method 1200 proceeds back to select (at 1230) another group of potential fills. The method 1200 iteratively selects (at 1225) all the groups of fills and specifies (at 1240) all the available legal fills.

Figure 18:
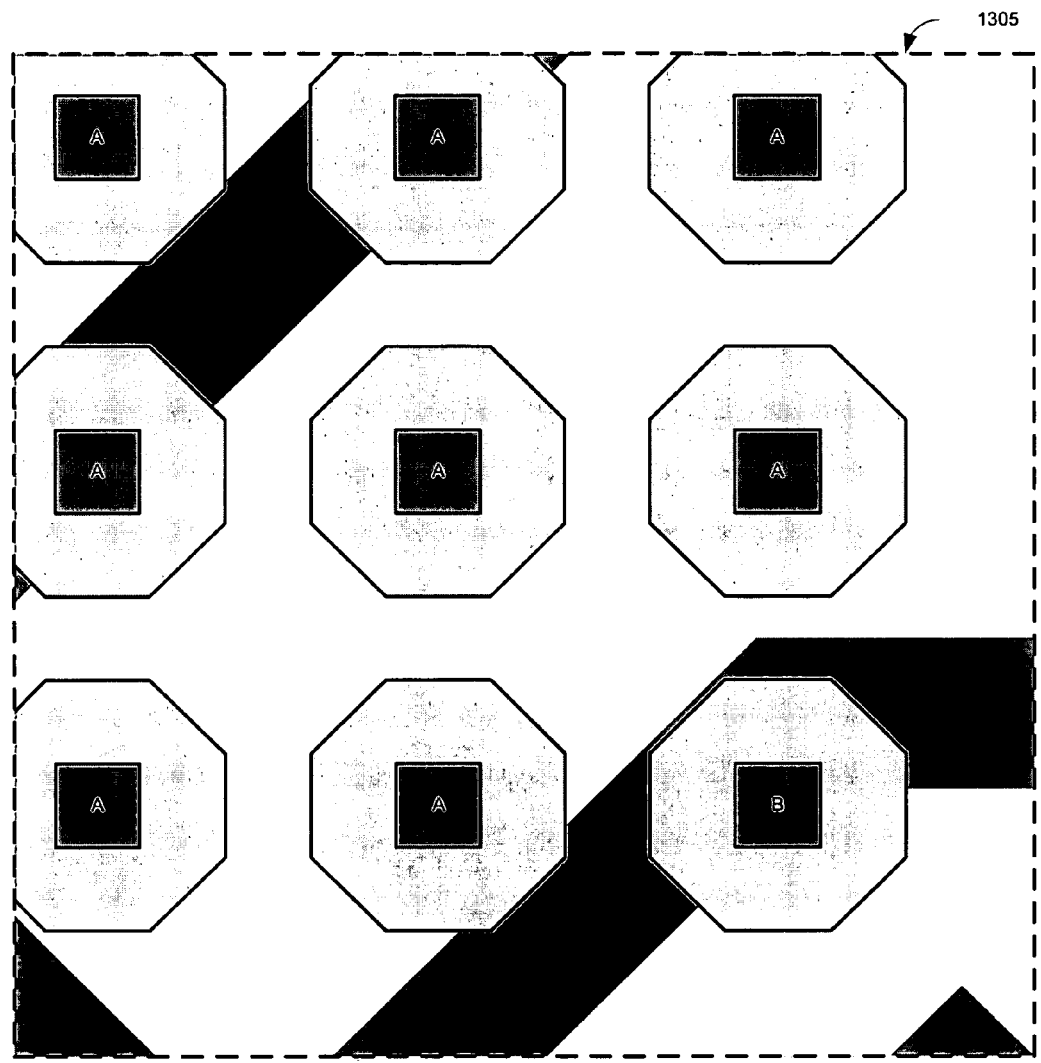
FIG. 18 illustrates a first group of potential fills that include halos in a tile.

FIG. 18 illustrates a first group (e.g., group A) of potentials fills in the tile 1305. As shown in this figure, the halos of potentials fills 1805-1810, 1820 and 1840-1845 overlap with interconnects in the tile 1305. Therefore, the potentials fills 1805-1810, 1820 and 1840-1845 are removed. The remaining potential fills, namely potential fills 1815, 1825-1835, are specified as available legal fills.

Figure 19:
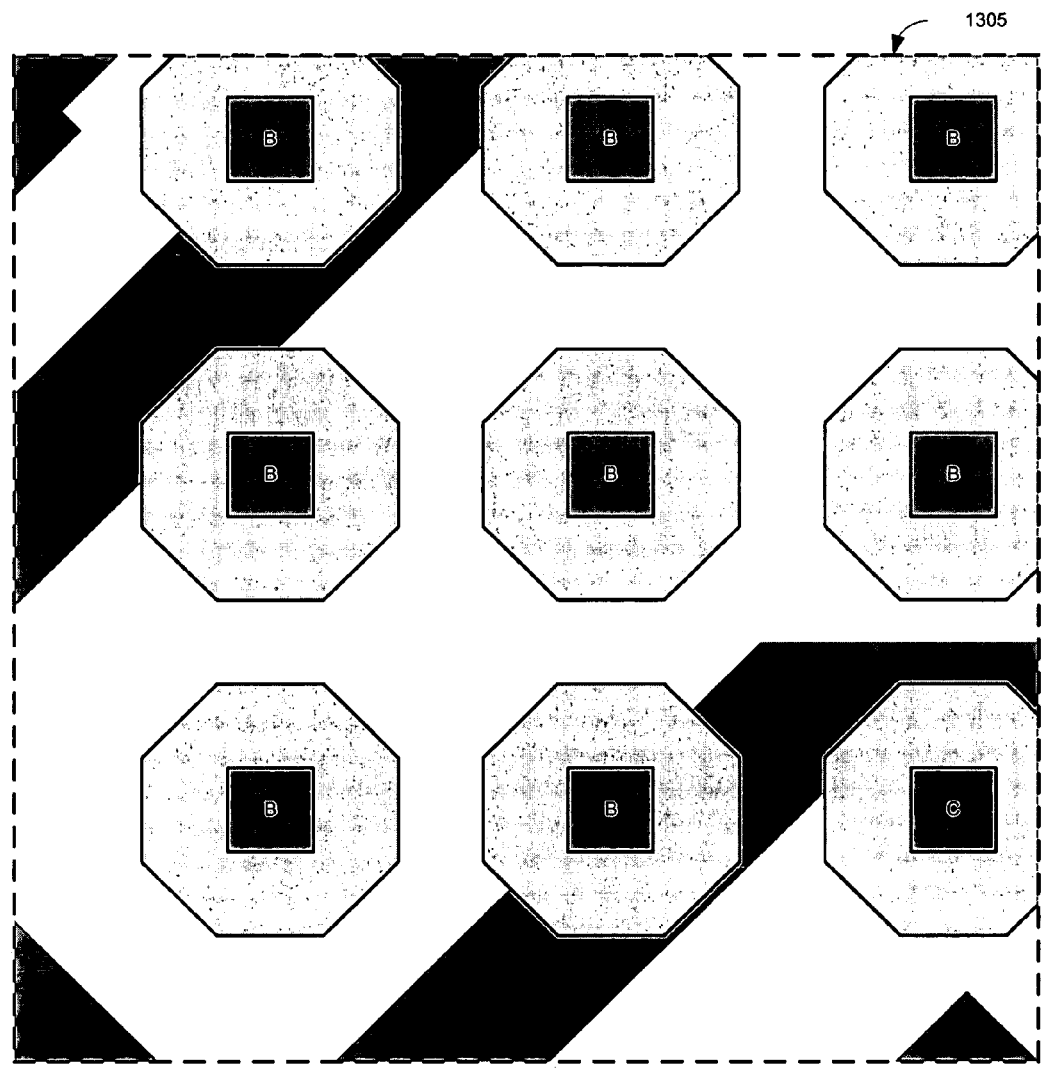
FIG. 19 illustrates a second group of potential fills that include halos in a tile.
Figure 20:
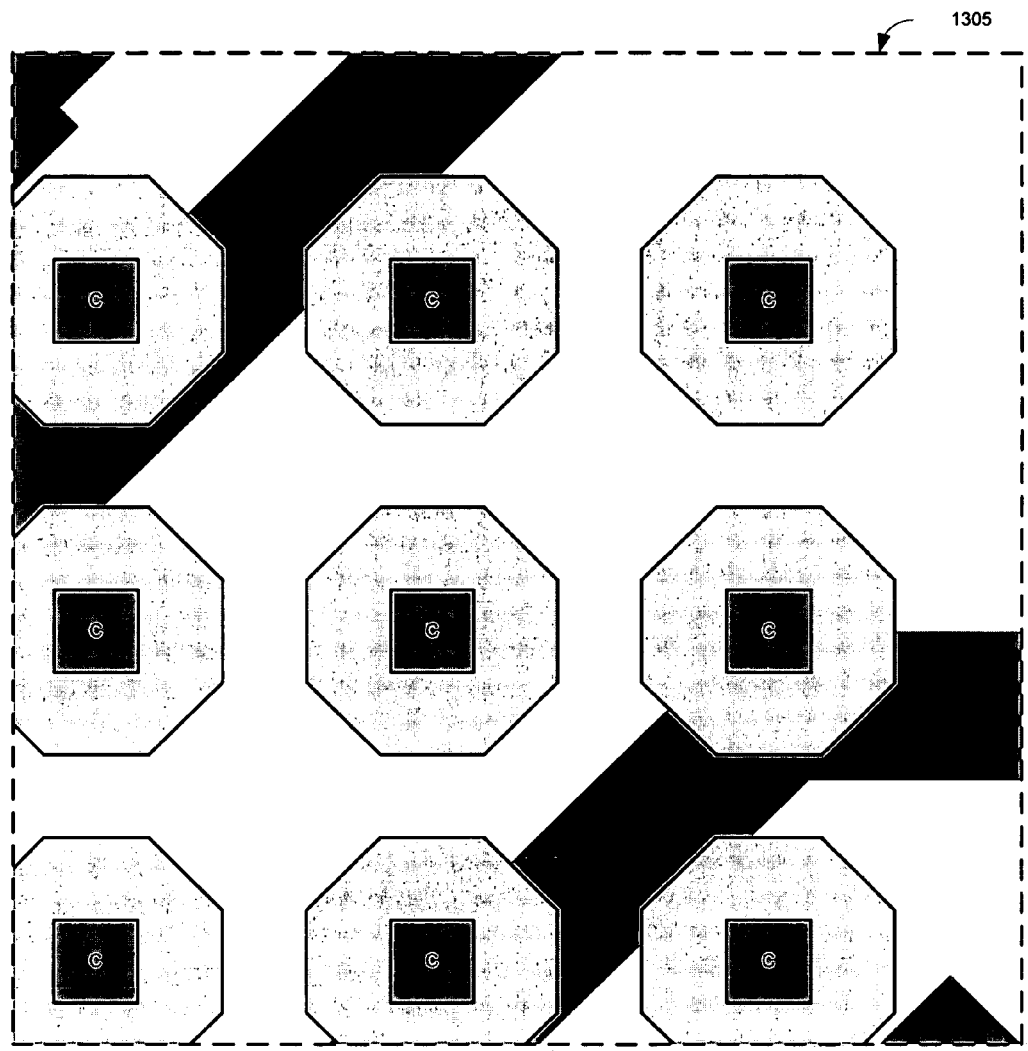
FIG. 20 illustrates a third group of potential fills that include halos in a tile.
Figure 21:
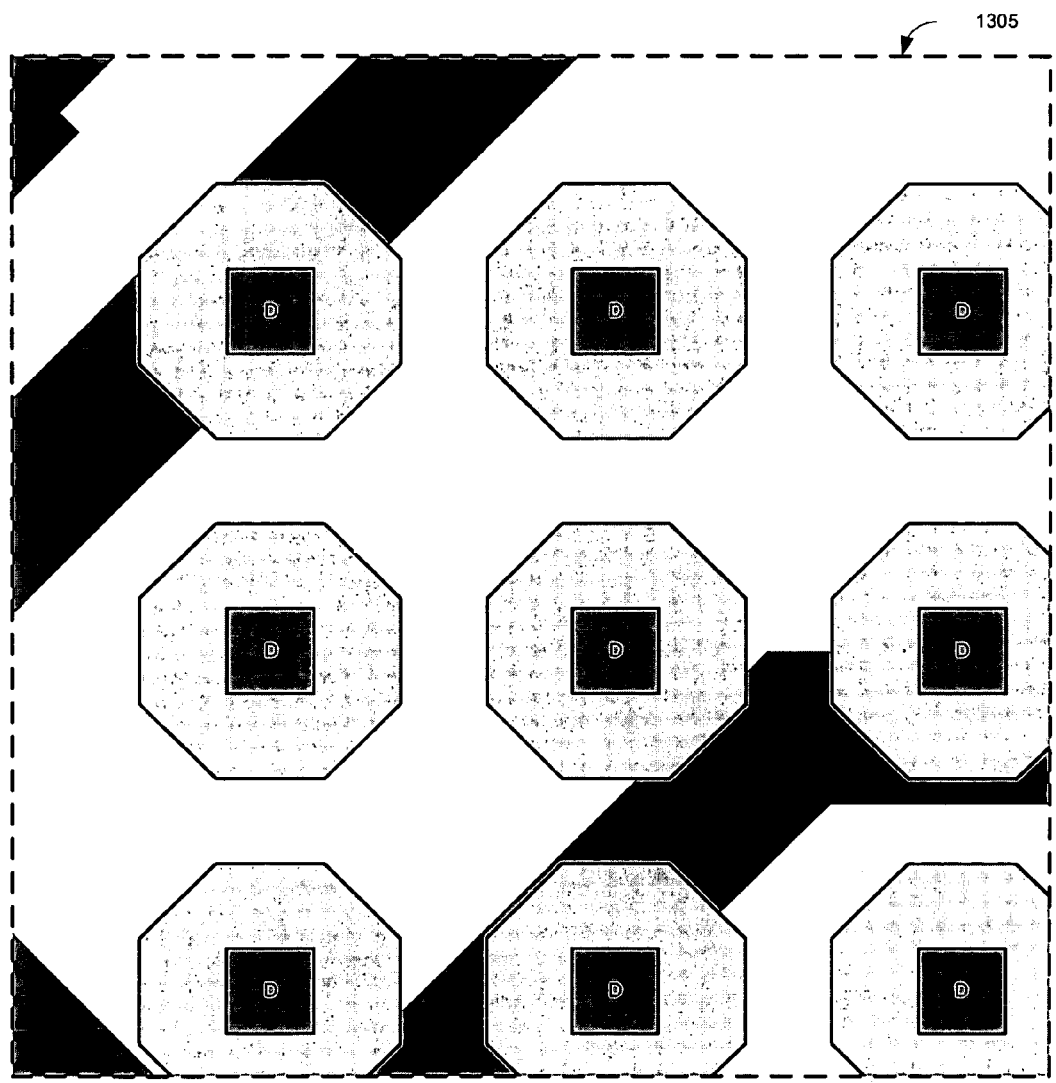
FIG. 21 illustrates a fourth group of potential fills that include halos in a tile.
Figure 22:
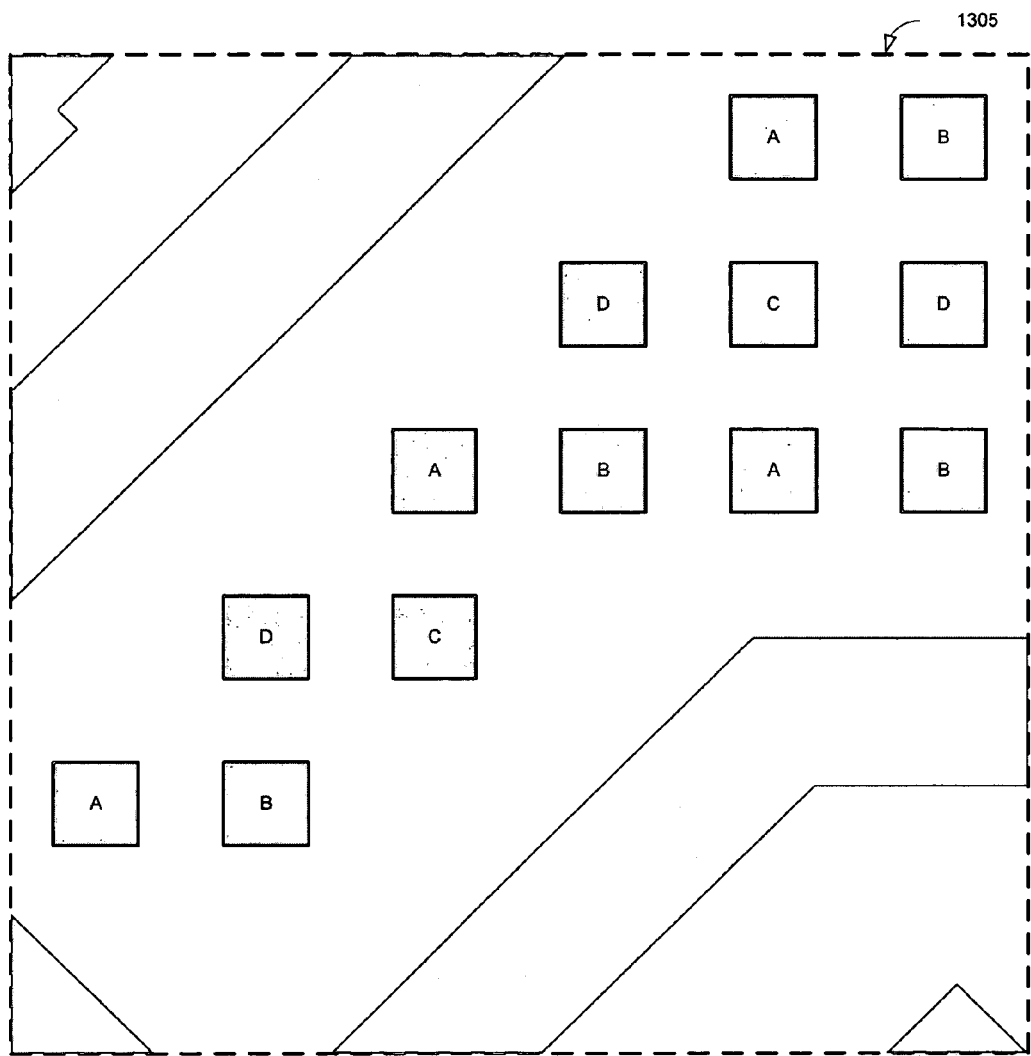
FIG. 22 illustrates legal fills in the tile.

FIGS. 19-21 illustrate the same tile that includes different groups of potential fills during different iterations of the method 1200. FIG. 22 illustrates the tile 1305 that includes all the specified available fills. As shown in this figure, the available fills are from different groups of potential fills. In some embodiments, the process of selecting a group of fills is referred to as batch processing, because the fills are processed in batches (e.g., groups).

After determining (at 1245) that there are no more groups of potential fills (because the method has iteratively selected (at 1230) all the groups and specified (at 1240) all the available fills), the method 1200 proceeds to 1250 to insert a fill. In some embodiments, the method 1200 inserts a fill from the legal fills specified at 1240. Once a particular legal fill is inserted (at 1250), that particular legal fill is removed (at 1252) as an available legal fill for any subsequent insertion, in some embodiments of the invention.

Furthermore, once a particular legal fill is inserted in the tile, that particular inserted legal fill is part of the IC layout. Therefore, during subsequent iterations of the process 1200, the particular inserted legal fill is taken into account when the process 1200 determines whether smaller sized potential fills are legal. In other words, the process 1200 considers whether or not the halo of the smaller sized potential fill overlaps with a previously inserted legal fill when determining whether the smaller sized potential fill is legal. In some embodiments, a smaller sized potential fill will not be legal if its associated halo overlaps with a previously inserted legal fill.

Next, the method 1200 determines (at 1255) whether to insert more fill in the tile. If so, the method 1200 returns to 1205 to determine whether previously defined legal fills are available. However, if the method 1200 determines (at 1255) that there are no fills to insert, the method 1200 ends.

Different embodiments use different criteria to determine whether to insert more fill in the tile. For instance, some embodiments do not insert more fill in the particular tile after determining that the insertion of the fill will result in the density of the window that includes the particular tile to reach the maximum density limit. Furthermore, some embodiments only insert one fill and do not make the determination (at 1255).

In some instances, after re-assigning priorities for the tiles, some embodiments might return to a tile that has already been processed (i.e., a fill has already been inserted in the tile). In such cases, there may be remaining legal fills specified during the previous processing of the tile. If this is the case, the method 1200 determines (at 1205) there are available legal fills and proceeds to insert (at 1250) fills in the particular tile.

Furthermore, the method 1200 is described using a method that processes the potential fills in four groups (e.g., batch). However, different embodiments may use different numbers of groups. Moreover, in some embodiments, the method 1200 can be implemented to process the fills one at a time (i.e., not in groups).

B. Different Size Fills

In some embodiments, the method described above has inserted all the possible legal fills for a particular size. However, the minimum density requirement has still not been met by a window that includes a particular tile. In such instances, some embodiments specify smaller size legal fills to be inserted in the tile.

Figure 23:
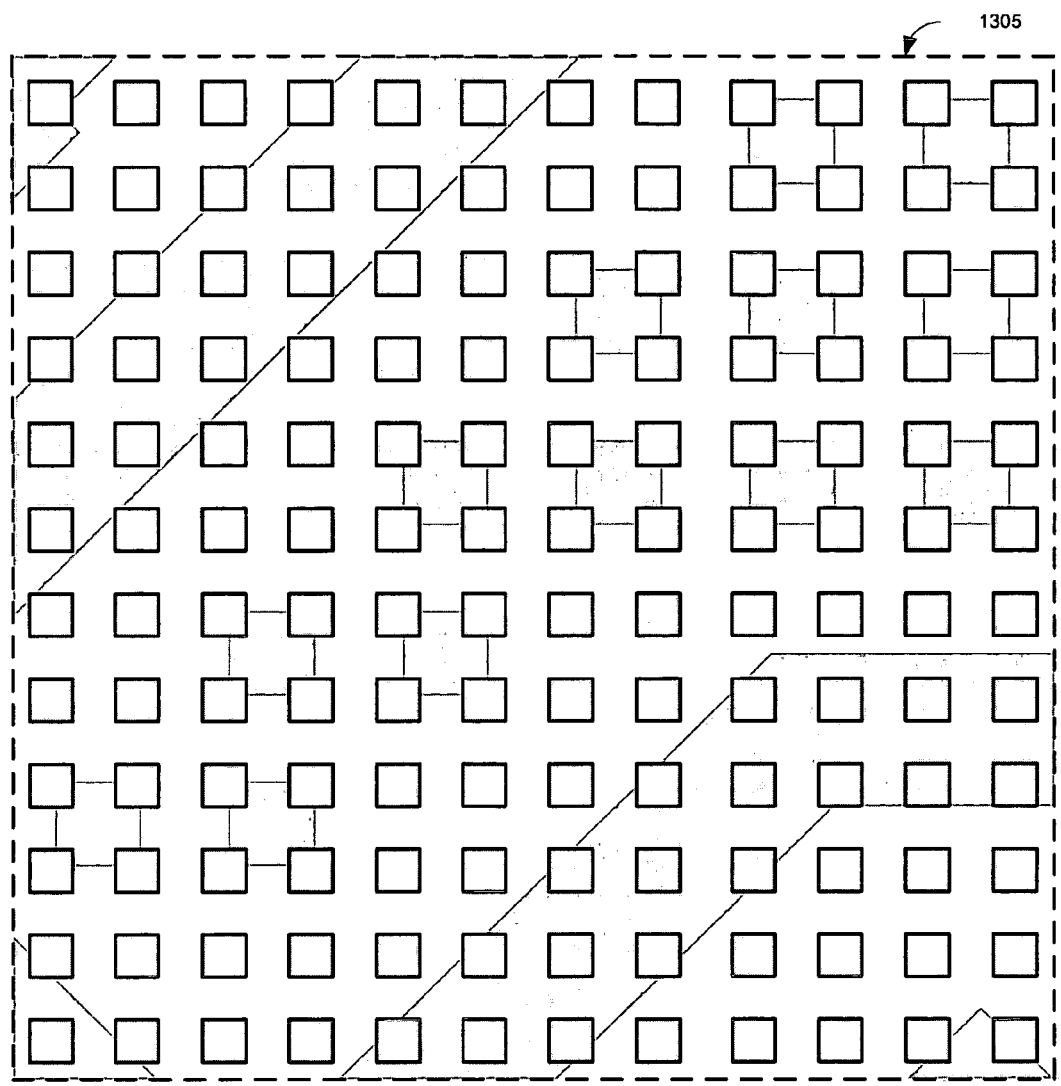
FIG. 23 illustrates the identification of groups of smaller potential fills in a tile.

Therefore, in some embodiments, when the method 1200 selects (at 1210) the size of the fill, the method 1200 considers the size of the last fill inserted in the previous iteration of inserting a fill in the tile. Thus, in some embodiments, the method 1200 selects a fill size that is a step size smaller than the fill size of the last inserted legal fill. For example, if in the last iteration, the method 1200 inserted the largest possible fill size, the method 1200 would select (at 1210) the second largest fill size from the set of fill sizes. FIG. 23 illustrates the tile 1305 with potential legal fills that have a smaller fill shape size than the fills in FIGS. 17-22.

Figure 24:
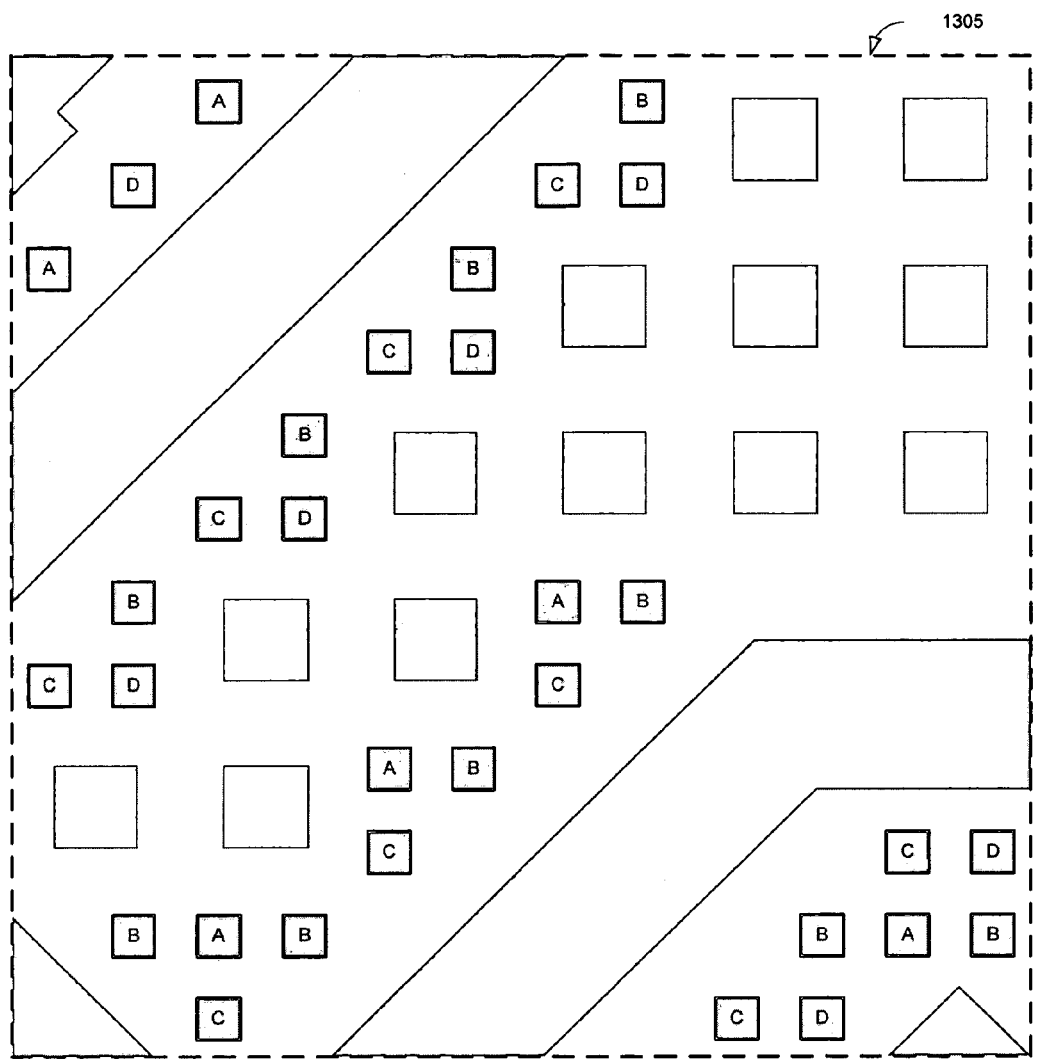
FIG. 24 illustrates smaller legal fills in the tile.

FIG. 24 illustrates a tile that includes a set of inserted fills and available fills. As shown in this figure, the tile 1305 includes several inserted larger fills and several smaller available fills (e.g., fills that have not been inserted in the tile). As further shown in this figure, the available fills were specified using the batch process described above (which is indicated by each available fill having a letter designating a group that it belongs in).

Figure 25:
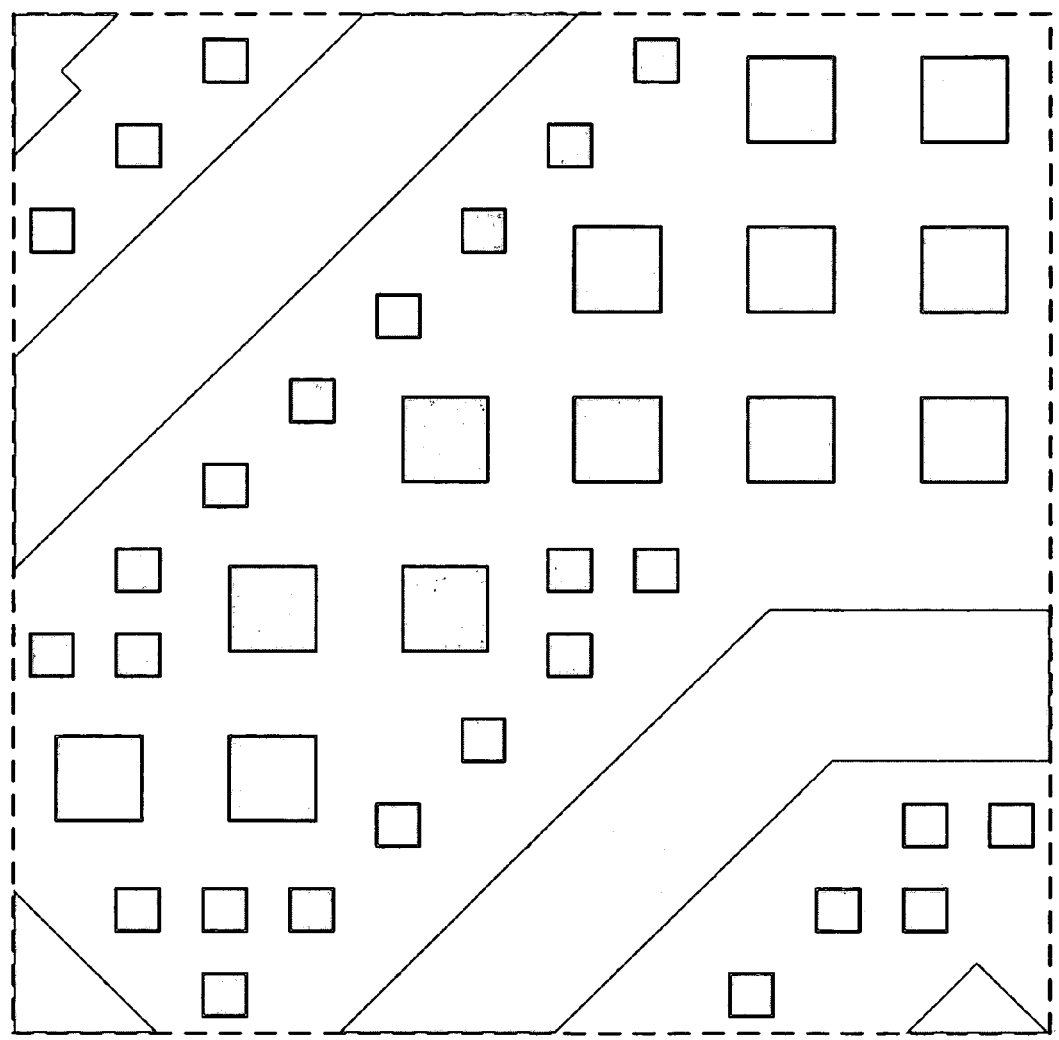
FIG. 25 illustrates inserted square fills in the tile.
Figure 26:
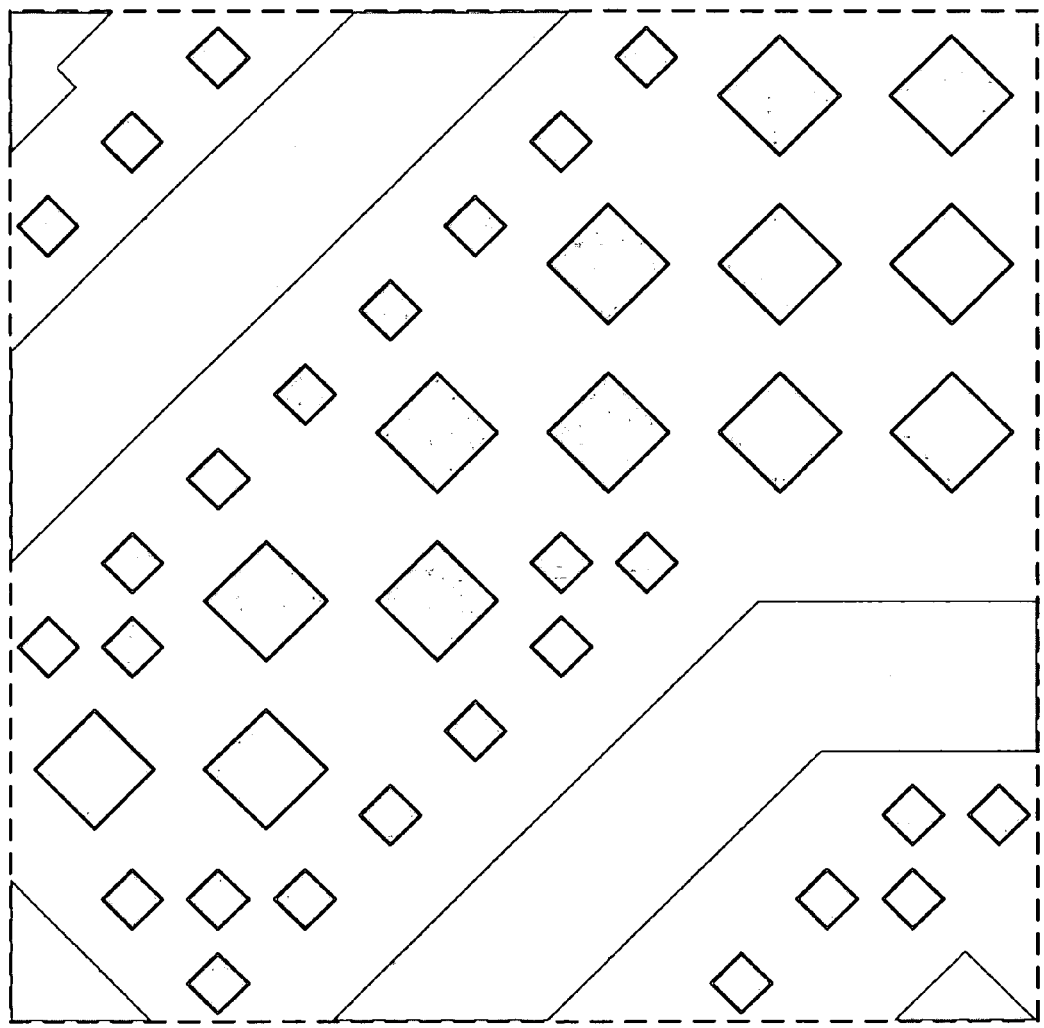
FIG. 26 illustrates inserted diamond fills in the tile.
Figure 27:
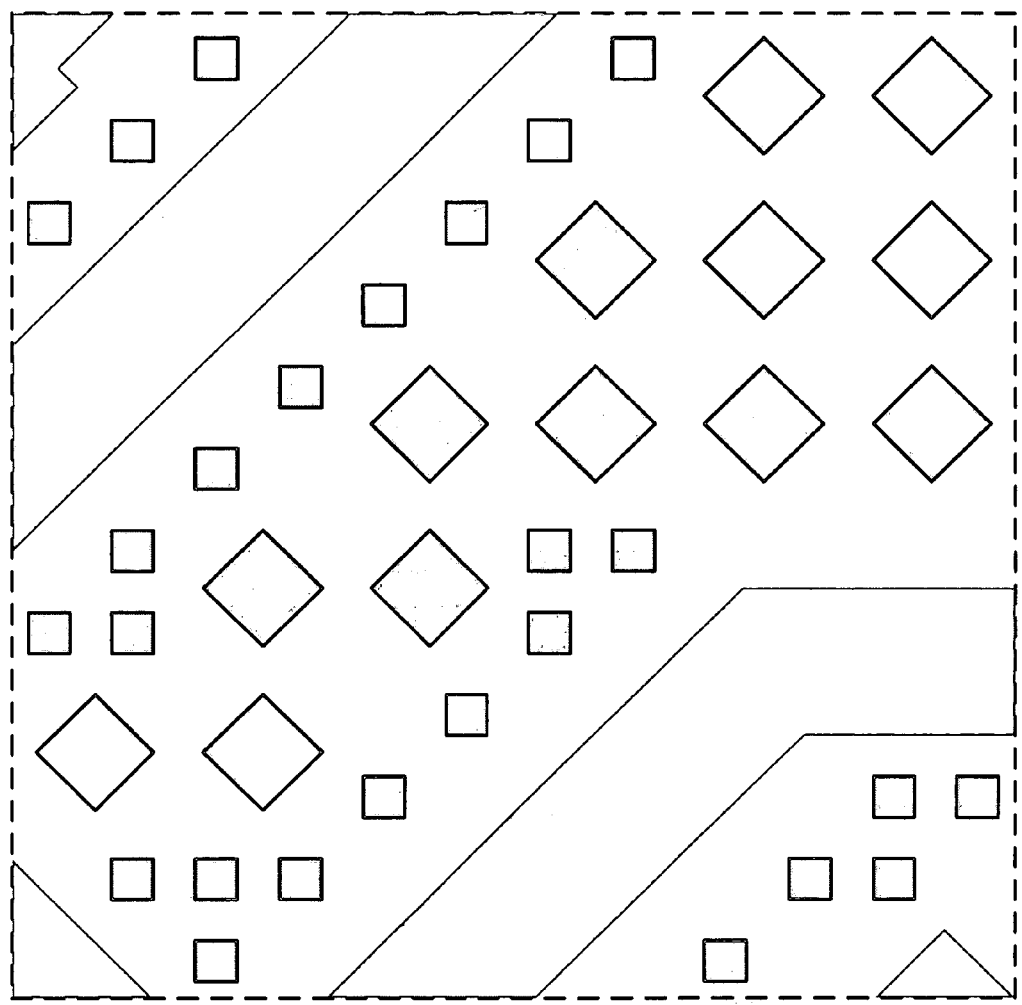
FIG. 27 illustrates inserted diamond and square fills in the tile.
Figure 28:
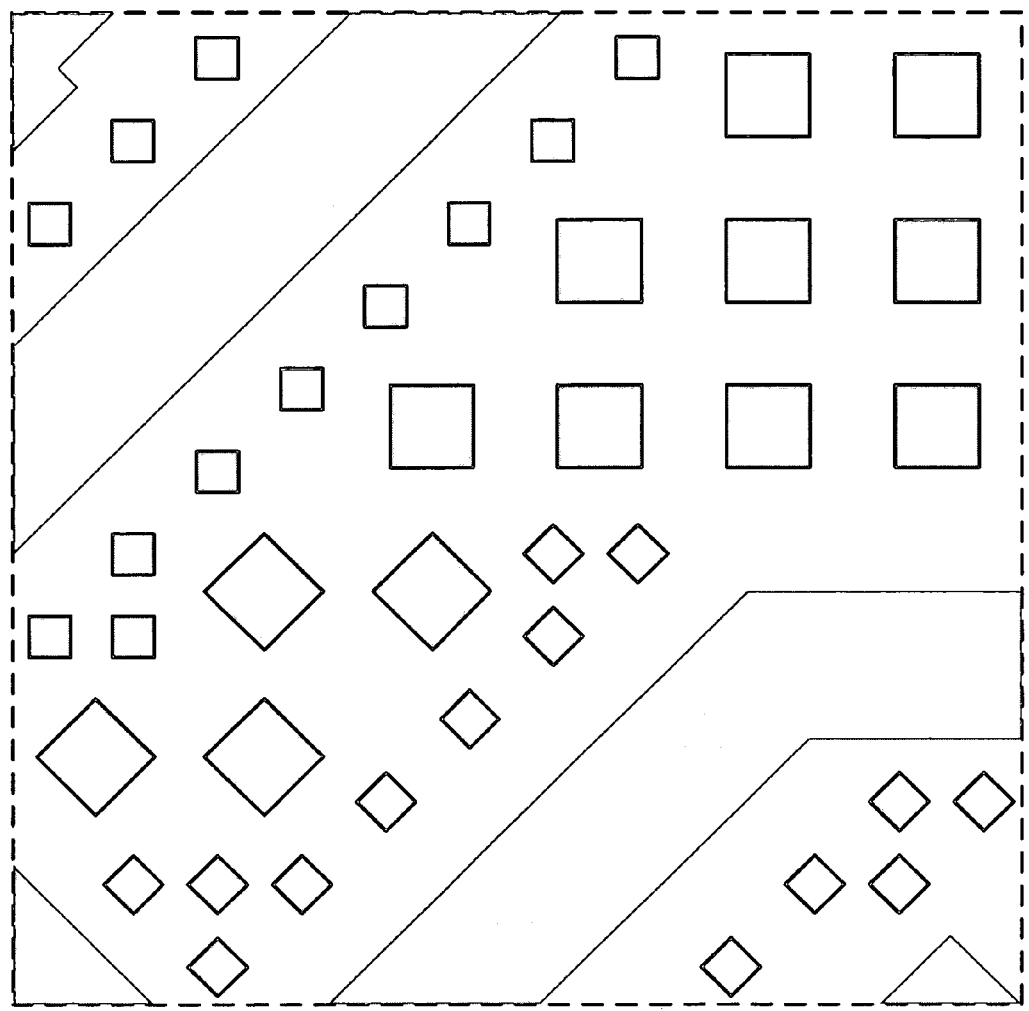
FIG. 28 illustrates inserted diamond and square fills in the tile.

FIG. 25 illustrates a tile that includes square shaped fills. Specifically, this figure illustrates square fills with different sizes. FIG. 26 illustrates a tile that includes diamond shaped fills. Specifically, this figure illustrates diamond fills with different sizes. FIGS. 27 and 28 illustrate a tile with different combinations of fills. Specifically, FIG. 27 illustrates a tile that includes large diamond fills and small square fills. FIG. 28 illustrates a tile that includes large diamond and square fills, and small diamond and square fills.

C. Staggered Fills

Figure 29:
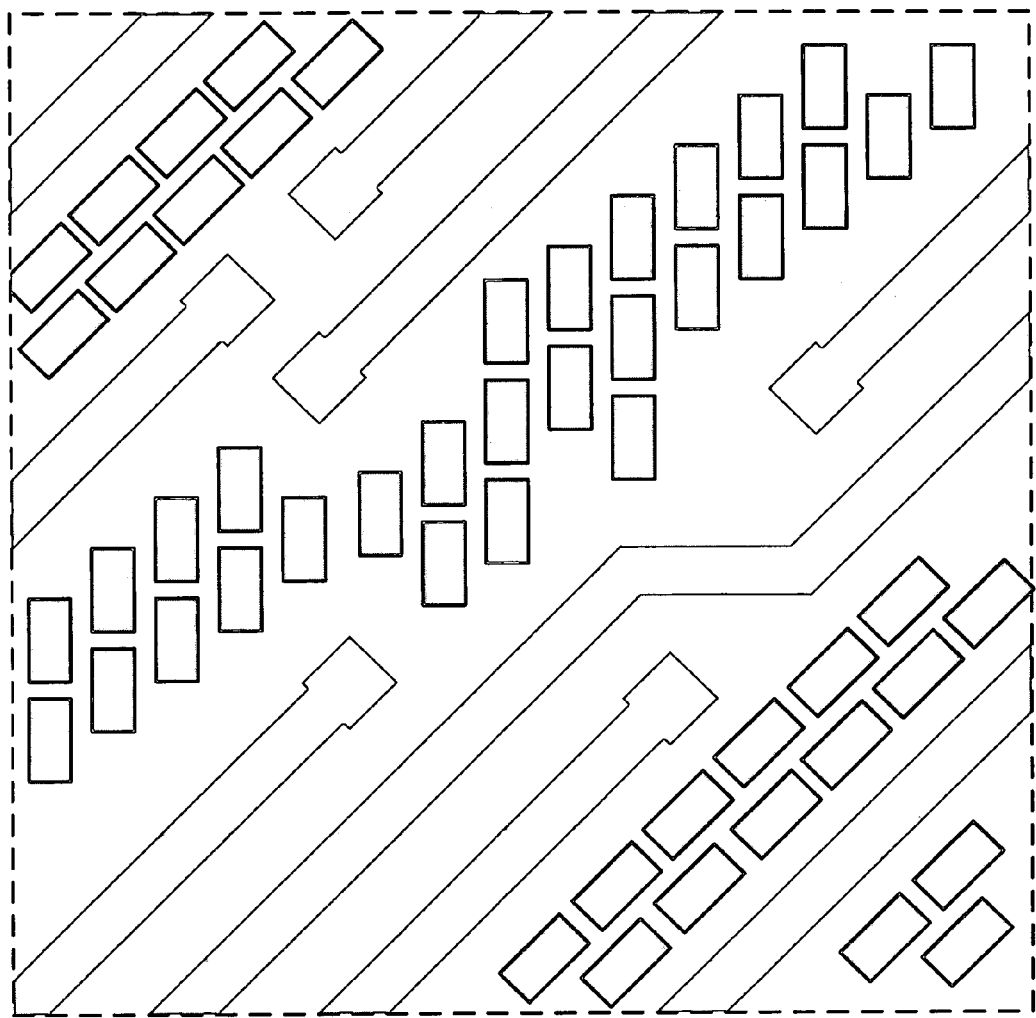
FIG. 29 illustrates several tiles with inserted staggered rectangular fills.

In some embodiments, fills are inserted in a tile in a staggered configuration. In some embodiments, staggering the configuration of fills in a tile prevents channels to be formed between the fills. FIG. 29 illustrates several tiles that have staggered fills. As shown in this figure, the fills are rectangular and staggered in different configurations.

Figure 30:
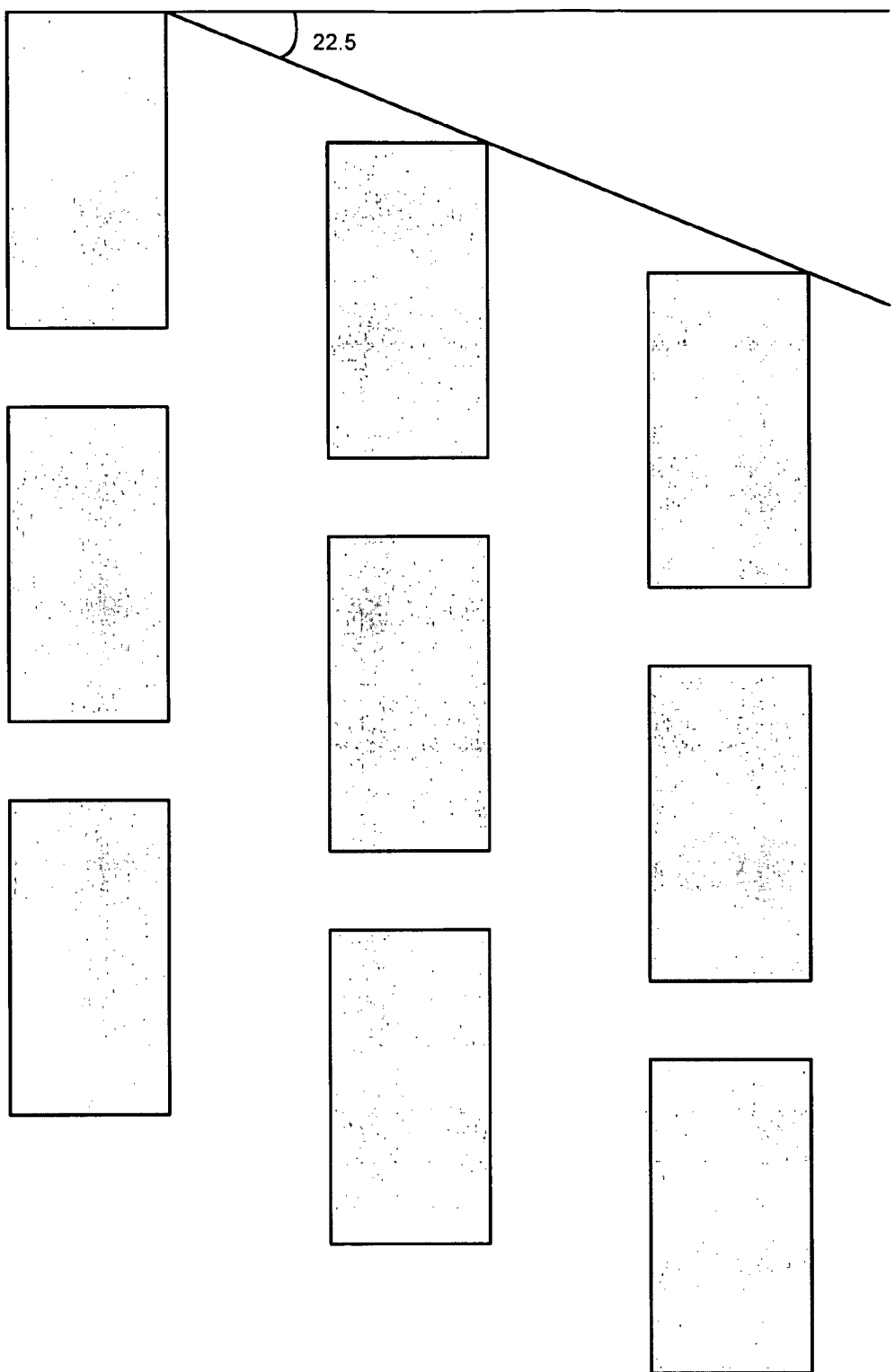
FIG. 30 illustrates rectangular fills staggered at 22.5 degrees relative to the horizontal axis.

Different embodiments of the invention stagger the fills differently. In some embodiments, the fills are staggered by 45 degrees relative to either the vertical or horizontal axis. In some embodiments, the fills are staggered by 22.5 degrees relative to the horizontal axis, as shown in FIG. 30. However, in some embodiments, the fills can also be staggered by 22.5 degrees relative to the vertical axis. While several angles are shown, one skilled in the art will understand that the fills can be staggered by any angle.

D. Specifying Legal Fills Based on Inserted Lines in Tile

Figure 31:
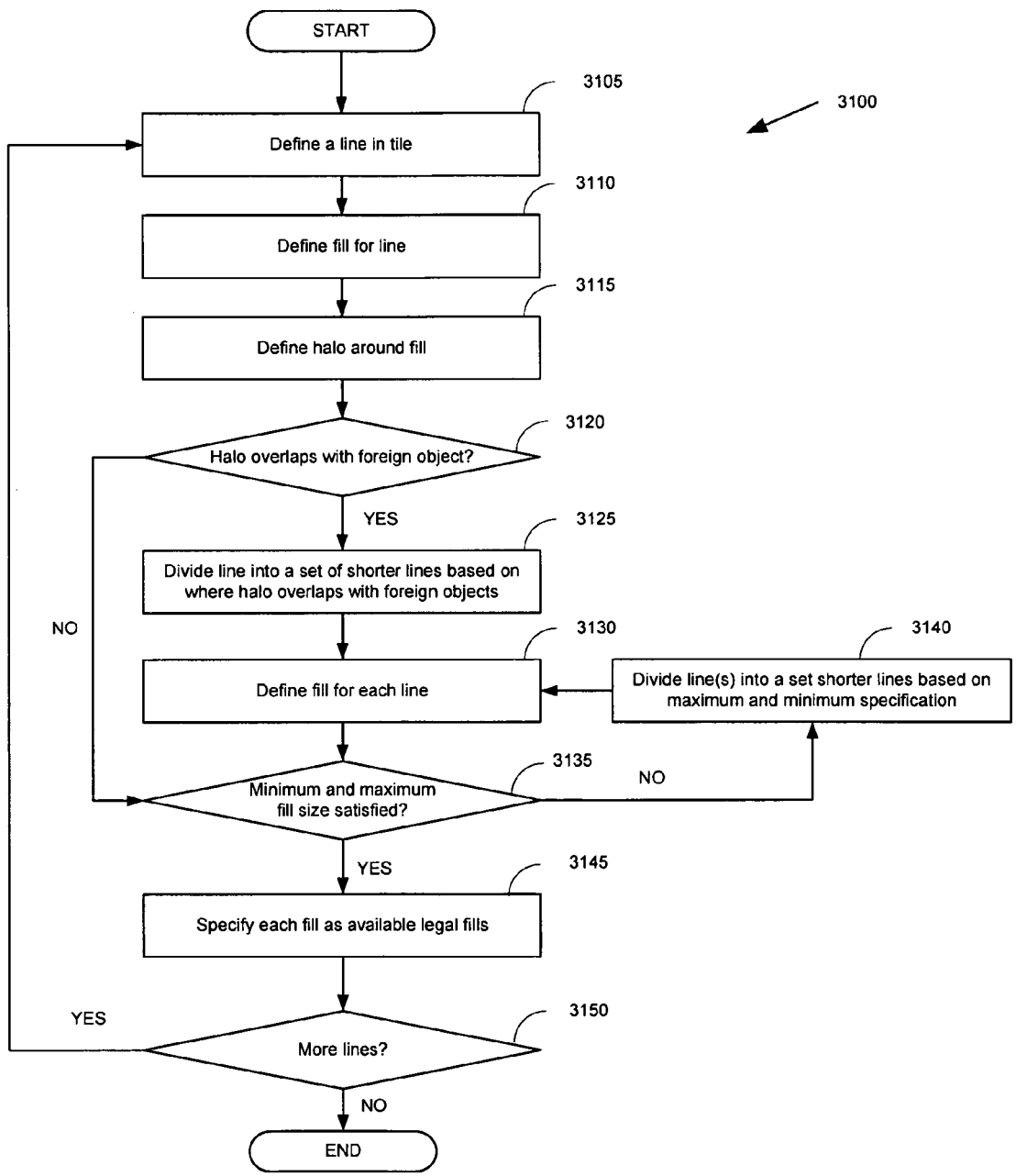
FIG. 31 illustrates a process for specifying legal fills based on a line.

Different embodiments identify legal fills differently. Some embodiments identify legal fills based on inserted lines in a tile. FIG. 31 illustrates a process 3100 for identifying legal fill based on inserted lines in the tile. In some embodiments, the process 3100 is performed during process 1200 described above.

Figure 32:
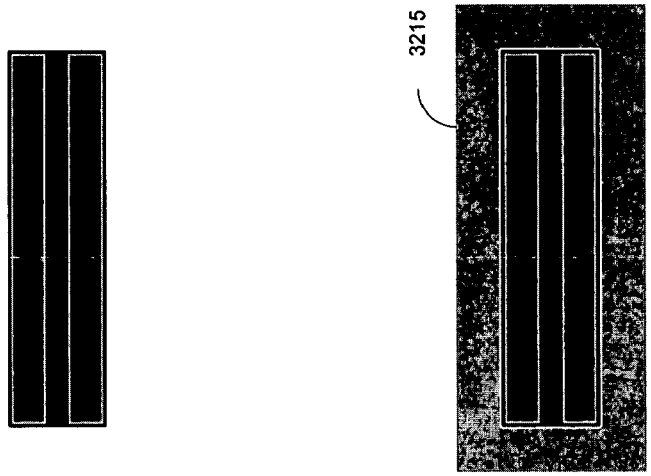
FIG. 32 illustrates defining a fill around a line and a halo around a fill.
Figure 32:
Figure 32:
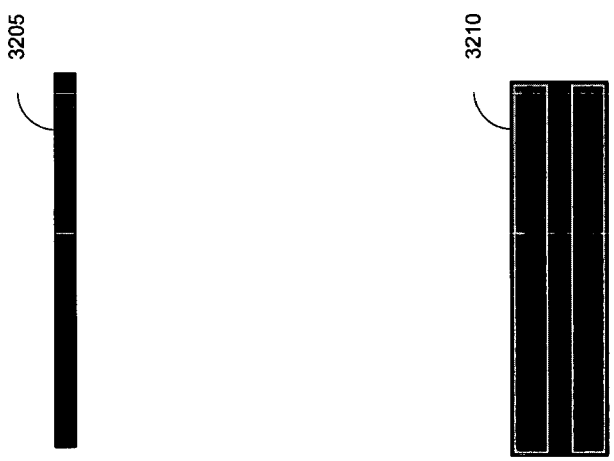

As shown in this figure, the process 3100 defines (at 3105) a line in a tile. The line is a long continuous line in some embodiments of the invention. The process 3100 defines (at 3110) a potential fill based on the line. After defining (at 3110) the potential fill, the process 3100 defines (at 3115) a halo around the potential fill. FIG. 32 conceptually illustrates the process of defining a potential fill around a line and a halo around the potential fill. Specifically, the figure illustrates a fill 3210 being defined around a line 3205. After the potential fill 3210 is defined, a halo 3215 is defined around the potential fill 3210.

Figure 33:
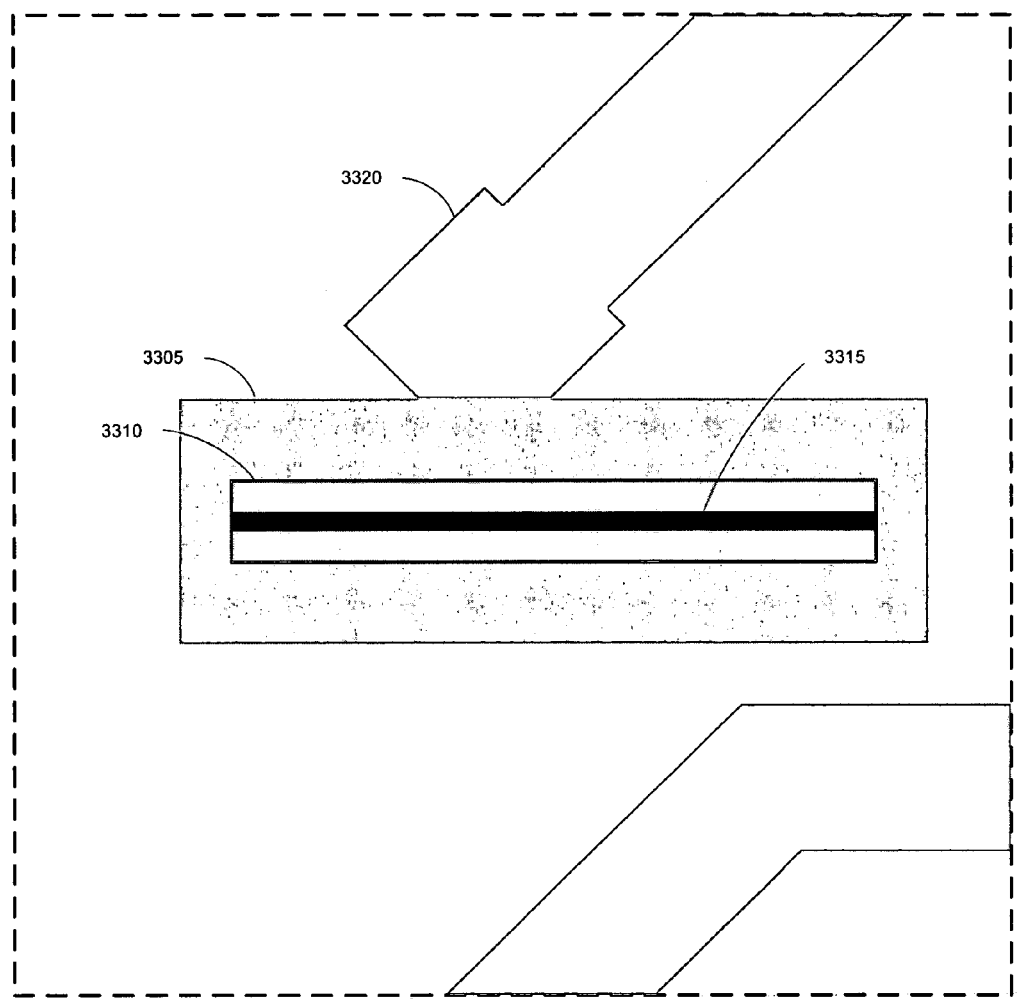
FIG. 33 illustrates a halo in a tile that overlaps with a foreign object.
Figure 34:
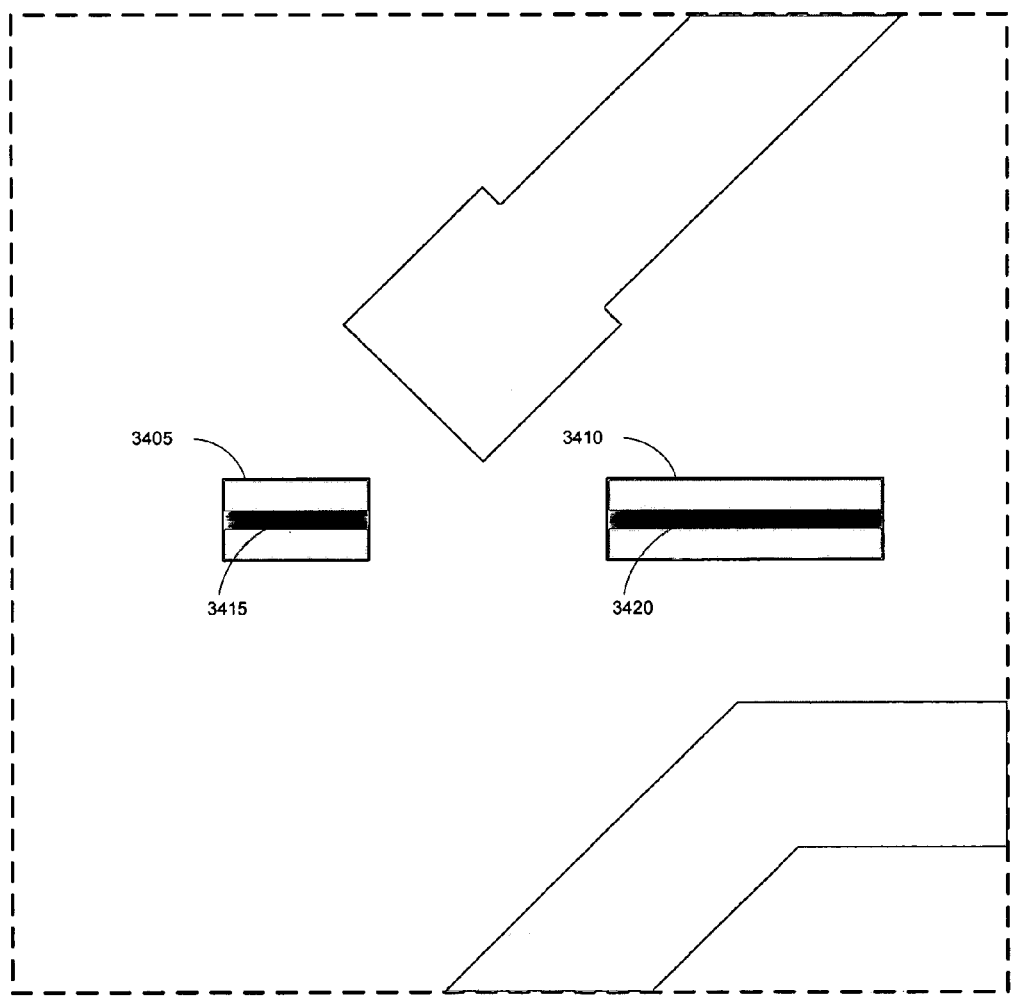
FIG. 34 illustrates a set of legal fills based on an inserted line.

Next, the process 3100 determines (at 3120) whether the halo overlaps a foreign object in the tile (e.g., interconnect, via, fill). If not, the process 3100 proceeds to 3135. However, if the process 3100 determines (at 3120) that the halo overlaps with a foreign object in the tile, the process 3100 divides (at 3125) the line based on where the halo overlaps with the foreign object. The process 3100 defines (at 3130) a fill based on each divided line. FIGS. 33 and 34 illustrate the process of dividing a line. Specifically, FIG. 33 illustrates a halo 3305, defined around a potential fill 3310 (which is defined around a line 3315), that overlaps with a via 3320. FIG. 34 illustrates the two fills 3405-3410 defined around two lines 3415-3420. The two lines 3415-3420 are based on line 3315 of FIG. 33. Specifically, lines 3415-3420 are divided lines based on where the halo 3305 overlaps with the via 3320.

The method 3100 determines (at 3135) whether the potential fill(s) defined (at 3110 or 3130) satisfy minimum and maximum fill sizes (e.g., user specified criteria). If not, the process 3100 divides (at 3140) the line(s) based on the minimum and maximum specification and proceeds to define (at 3130) the potential fill for each divided line.

However, if the process 3100 determines (at 3135) that the potential fill meet minimum and maximum fill sizes, the process 3100 specifies (at 3145) each potential fill as legal fill. Next, the process 3100 determines (at 3150) whether there are more lines to define in the tile. If so, the process 3100 proceeds to 3105 to define the next lines. If not, the process 3100 ends.

Different embodiments perform some of the above steps differently. For instance, some embodiments initially define all the lines for the tile at 3105. Moreover, some embodiments divide a line based concurrently on where the halo overlaps with a foreign object and the minimum and maximum specification for a fill size. Furthermore, some embodiments divide the line into more than two lines. For instance, when the halo overlaps foreign objects at more than one location. Additionally, some embodiments may specify different fills sizes for each line (e.g., thinner or thicker fill sizes). Furthermore, different embodiments may specify different line orientation (e.g., vertical orientation, diagonal orientation). Moreover, while the rectangular fills in FIGS. 32 and 33 are illustrated with rectangular halos, some embodiments might use different shaped halos (e.g., octagon).

Figure 35:
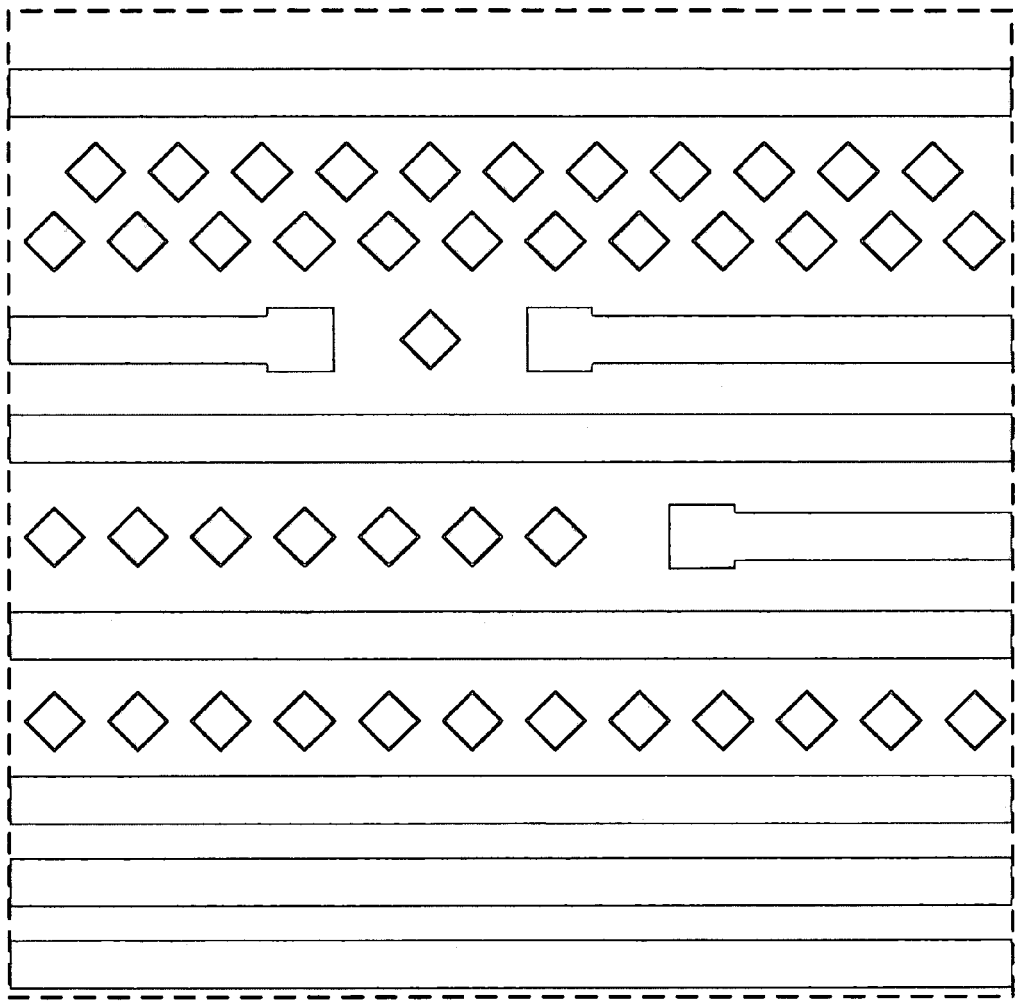
FIG. 35 conceptually illustrates a portion of a Manhattan IC layout with staggered diamond fills.

In the description of some embodiments of the invention described above, the fills are inserted for a non-Manhattan layout. However, the methods (e.g., methods 400 and 1200) described above can also be implemented in a Manhattan layout. FIG. 35 illustrates a portion of a Manhattan layout that includes diamond shaped fills that are staggered.

III. Computer System

Figure 36:
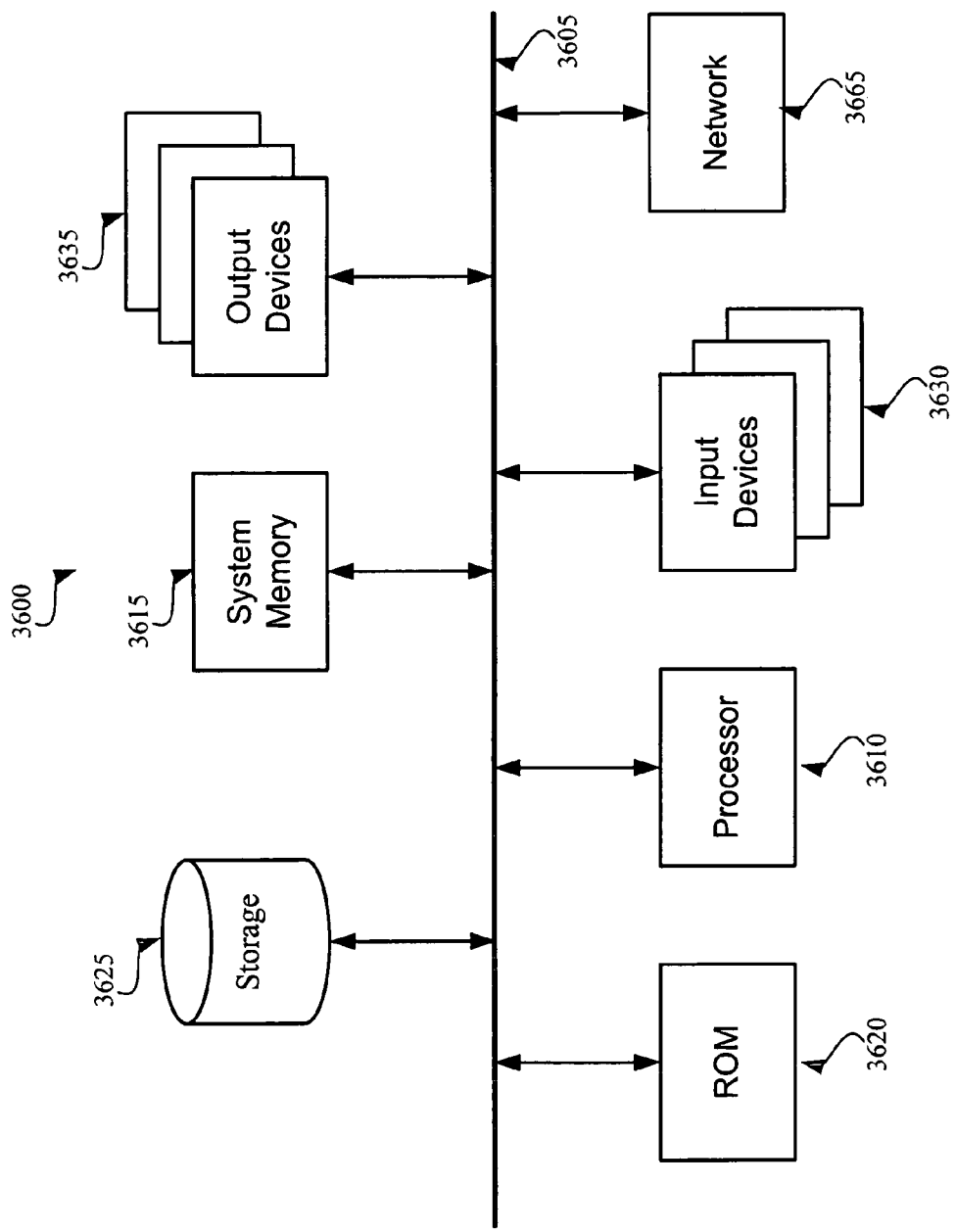
FIG. 36 conceptually illustrates a computer system with which some embodiments of the invention is implemented.

FIG. 36 conceptually illustrates a computer system with which some embodiments of the invention is implemented. The computer system 3600 includes a bus 3605, a processor 3610, a system memory 3615, a read-only memory 3620, a permanent storage device 3625, input devices 3630, and output devices 3635.

The bus 3605 collectively represents all system, peripheral, and chipset buses that support communication among internal devices of the computer system 3600. For instance, the bus 3605 communicatively connects the processor 3610 with the read-only memory 3620, the system memory 3615, and the permanent storage device 3625.

From these various memory units, the processor 3610 retrieves instructions to execute and data to process in order to execute the processes of the invention. The read-only-memory ("ROM") 3620 stores static data and instructions that are needed by the processor 3610 and other modules of the computer system. The permanent storage device 3625, on the other hand, is a read-and-write memory device. This device is a non-volatile memory unit that stores instruction and data even when the computer system 3600 is off. Some embodiments of the invention use a mass-storage device (such as a magnetic or optical disk and its corresponding disk drive) as the permanent storage device 3625. Other embodiments use a removable storage device (such as a floppy disk or Zip® disk, and its corresponding disk drive) as the permanent storage device.

Like the permanent storage device 3625, the system memory 3615 is a read-and-write memory device. However, unlike storage device 3625, the system memory is a volatile read-and-write memory, such as a random access memory. The system memory stores some of the instructions and data that the processor needs at runtime. In some embodiments, the invention's processes are stored in the system memory 3615, the permanent storage device 3625, and/or the read-only memory 3620.

The bus 3605 also connects to the input and output devices 3630 and 3635. The input devices enable the user to communicate information and select commands to the computer system. The input devices 3630 include alphanumeric keyboards and cursor-controllers. The output devices 3635 display images generated by the computer system. The output devices include printers and display devices, such as cathode ray tubes ("CRT") or liquid crystal displays ("LCD").

Finally, as shown in FIG. 36, bus 3605 also couples computer 3600 to a network 3665 through a network adapter (not shown). In this manner, the computer can be a part of a network of computers (such as a local area network ("LAN"), a wide area network ("WAN"), or an Intranet) or a network of networks (such as the Internet). Any or all of the components of computer system 3600 may be used in conjunction with the invention. However, one of ordinary skill in the art will appreciate that any other system configuration may also be used in conjunction with the invention.

While the invention has been described with reference to numerous specific details, one of ordinary skill in the art will recognize that the invention can be embodied in other specific forms without departing from the spirit of the invention. Thus, one of ordinary skill in the art would understand that the invention is not to be limited by the foregoing illustrative details, but rather is to be defined by the appended claims.

What is claimed is:

1. A method for inserting a plurality of fills in an integrated circuit ("IC") layout, the method comprising:
   a) identifying, via a computer system, a set of potential fills in a region of the IC layout;
   b) for each particular potential fill, defining a shape that includes the particular potential fill and an additional area surrounding the particular potential fill;
   c) for each of the particular potential fills, determining whether said shape corresponding to said particular potential fill and said area surrounding said particular potential fill overlaps with any object in the region of the IC layout;
   d) for each of the particular potential fills, specifying a legal fill in the region of the IC layout when the shape does not overlap with any object in the region of the IC layout; and
   e) inserting at least one legal fill in the region of the IC layout.

2. The method of claim 1, wherein specifying at least one legal fill comprises:
   a) dividing the set of potential fills in a plurality of groups;
   b) iteratively selecting the group of potential fills; and
   c) specifying at least one legal fill from the groups of potential fills, during one or more iteration of the selection of groups of potential fills.

3. The method of claim 1, wherein the set of potential fills comprises a first set of potential fills and a second set of potential fills, wherein the first set of potential fills comprises a first fill size, wherein the second set of potential fills comprises a second fill size, wherein steps a) through d) are performed for the first set of potential fills comprising the first fill size, wherein the method further comprises repeating steps a) through d) for the second set of potential fills comprising the second fill size.

4. The method of claim 1, wherein the shape is a particular object that comprises a particular shape that is different than a shape of the inserted fill.

5. The method of claim 1, wherein before identifying the set of potential fills in the region of the IC layout, the method further comprising:
   a) dividing the IC layout into a set of regions;
   b) assigning a priority to a region based on one or more areas of the region; and
   c) selecting a region based on the assigned priority.

6. The method of claim 1, wherein specifying the legal fill comprises dividing at least the particular potential fill into at least two legal fills, when the shape overlaps with any object in the region of the IC layout.

7. The method of claim 6, wherein the particular potential fill is divided based on a set of manufacturing criteria.

8. The method of claim 6, wherein the particular potential fill is divided based on where the shape overlaps with the object.

9. The method of claim 6, wherein the particular potential fill is divided into more than two legal fills when the shape overlaps more than one object.

10. The method of claim 1, wherein a particular legal fill is based on the particular potential fill without the additional area surrounding the particular potential fill.

11. The method of claim 1, wherein a particular legal fill is based on the shape of the particular potential fill, excluding the additional area surrounding the particular potential fill.

12. The method of claim 1, wherein specifying the legal fill comprises specifying a particular fill as available for inserting in the region of the IC layout.

13. The method of claim 1, wherein said additional area surrounding the particular potential fill identifies an area around a fill that cannot be occupied by wiring, circuit elements, or another fill.

14. The method of claim 1, wherein the object is an inserted fill.

15. The method of claim 1, wherein the object is a route.

16. The method of claim 1, wherein the object is a module.

17. A computer readable medium storing a computer program for inserting a plurality of fills in an integrated circuit ("IC") layout, wherein the computer program is executable by at least one processor, the computer program comprising sets of instructions for:
   a) identifying a set of potential fills in a region of the IC layout;
   b) for each particular potential fill, defining a shape that includes the particular potential fill and an additional area surrounding the particular potential fill;
   c) for each of the particular potential fills, determining whether the shape corresponding to the particular potential fill overlaps with any object in the region of the IC layout;
   d) for each of the particular potential fills, specifying a legal fill in the region of the IC layout when the shape does not overlap with any object in the region of the IC layout; and
   e) inserting at least one legal fill in the region of the IC layout.

18. The computer readable medium of claim 17, wherein the set of instructions for specifying at least one legal fill comprises sets of instructions for:
   a) dividing the set of potential fills in a plurality of groups;
   b) iteratively selecting the group of potential fills; and
   c) specifying at least one legal fill from the groups of potential fills, during one or more iteration of the selection of groups of potential fills.

19. The computer readable medium of claim 17, wherein the set of potential fills comprises a first set of potential fills and a second set of potential fills, wherein the first set of potential fills comprises a first fill size, wherein the second set of potential fills comprises a second fill size, wherein steps a) through d) are performed for the first set of potential fills comprising the first fill size, wherein the computer program further comprises sets of instructions for repeating steps a) through d) for the second set of potential fills comprising the second fill size.

20. The computer readable medium of claim 17, wherein the inserted fill is a diamond shaped fill.

21. The computer readable medium of claim 17, wherein the shape is a particular object that comprises a particular shape that is different than a shape of the inserted fill.

22. The computer readable medium of claim 17, wherein the computer program further comprises sets of instructions for:
   a) dividing the IC layout into a set of regions;

b) assigning a priority to a region based on one or more areas of the region; and c) selecting a region based on the assigned priority.

23. The computer readable medium of claim 17, wherein the set of instructions for specifying the legal fill comprises a set of instructions for dividing at least the particular potential fill into at least two legal fills, when the shape overlaps with any object in the region of the IC layout.

24. The computer readable medium of claim 23, wherein the particular potential fill is divided based on a set of manufacturing criteria.

25. The computer readable medium of claim 23, wherein the particular potential fill is divided based on where the shape overlaps with the object.

26. The computer readable medium of claim 23, wherein the particular potential fill is divided into more than two legal fills when the shape overlaps more than one object.

27. The computer readable medium of claim 17, wherein a particular legal fill is based on the particular potential fill without the additional area surrounding the particular potential fill.

28. The computer readable medium of claim 17, wherein a particular legal fill is based on the shape of the particular potential fill, excluding the additional area surrounding the particular potential fill.

29. The computer readable medium of claim 17, wherein the set of instructions for specifying the legal fill comprises a set of instructions for specifying a particular fill as available for inserting in the region of the IC layout.

30. A method for inserting fill in an integrated circuit ("IC") layout, the method comprising:

a) dividing, via a computer system, the IC layout into a set of regions;

b) assigning a priority to a region based on one or more areas of the region;

c) selecting a region based on the assigned priority;

d) defining a shape that includes a particular potential fill and an area about the particular potential fill;

e) determining whether the shape overlaps with any object in the selected region of the IC layout; and f) inserting a particular fill associated with the particular potential fill when the shape does not overlap with any object.

31. The method of claim 30, wherein the object is a route.

32. The method of claim 30, wherein the object is an inserted fill.

33. The method of claim 30, wherein the object is a module.

34. A method for inserting fill in an integrated circuit ("IC") layout, the method comprising:

a) identifying, via a computer system, a region of the IC layout to insert fills;

b) identifying a first type of fill comprising a first shape;

c) inserting at least one fill comprising the first shape;

d) identifying a second type of fill comprising a second shape, wherein the first shape is different than the second shape; and e) inserting at least one fill comprising the second shape in said identified IC region in order to meet a minimum density requirement.

35. The method of claim 34, wherein the first shape is a rectangle and the second shape is a diamond.

36. The method of claim 34 further comprising inserting at least two fills comprising a same shape, each fill comprising a different size.

37. A method for inserting fill in an integrated circuit ("IC") layout, the method comprising:

a) identifying, via a computer system, a region of the IC layout to insert fills, b) identifying a first type of fill comprising a first size;

c) inserting at least one fill comprising the first size;

d) determining whether the region of the IC layout meets a minimum density requirement; and e) when the minimum density requirement is not met, i) identifying a second type of fill comprising a second size, wherein the first size is different than the second size; and ii) inserting at least one fill comprising the second size in said identified IC region.

38. The method of claim 37, wherein the second size is smaller than the first size.

* * * * *